US012675178B2

(12) United States Patent
Hashimoto et al.

(10) Patent No.: US 12,675,178 B2
(45) Date of Patent: Jul. 7, 2026

(54) ROTARY OPERATOR, OPERATION DEVICE, AND ACOUSTIC CONTROL DEVICE

(71) Applicant: AlphaTheta Corporation, Yokohama (JP)

(72) Inventors: Takanori Hashimoto, Yokohama (JP); Kenji Muratani, Yokohama (JP); Taito Fujioka, Yokohama (JP)

(73) Assignee: Alpha Theta Corporation, Yokohama (JP)

(*) Notice: Subject to any disclaimer, the term of this patent is extended or adjusted under 35 U.S.C. 154(b) by 146 days.

(21) Appl. No.: 18/722,150

(22) PCT Filed: Dec. 24, 2021

(86) PCT No.: PCT/JP2021/048412
§ 371 (c)(1),
(2) Date: Jun. 20, 2024

(87) PCT Pub. No.: WO2023/119669
PCT Pub. Date: Jun. 29, 2023

(65) Prior Publication Data
US 2025/0053252 A1 Feb. 13, 2025

(51) Int. Cl.
*G06F 3/16* (2006.01)
*G06F 3/0362* (2013.01)

(52) U.S. Cl.
CPC ............ *G06F 3/0362* (2013.01); *G06F 3/165* (2013.01)

(58) Field of Classification Search
CPC .............................. G06F 3/0362; G06F 3/165
See application file for complete search history.

(56) References Cited

U.S. PATENT DOCUMENTS

2005/0052981 A1    3/2005  Shim et al.
2011/0013498 A1*   1/2011  Onizuka ................ G11B 19/02

FOREIGN PATENT DOCUMENTS

JP      2007-73135 A      3/2007
JP      2008021379 A  *   1/2008
(Continued)

OTHER PUBLICATIONS

International Preliminary Report on Patentability dated Jun. 20, 2024, Application No. PCT/JP2021/048412; 4 pages.
(Continued)

*Primary Examiner* — Joseph Saunders, Jr.
(74) *Attorney, Agent, or Firm* — Rankin, Hill & Clark LLP

(57) ABSTRACT

A rotary operator includes: a first rotating body rotatable around an imaginary rotation axis; a second rotating body being detachably attached, and being configured to rotate integrally with the first rotating body and also being rotatable around the rotation axis independently of the first rotating body; and a friction adjusting member being covered by the second rotating body as viewed from a side of the second rotating body with respect to the first rotating body and being configured to adjust friction force between the first rotating body and the second rotating body, in which the first rotating body includes: an installation portion to which the friction adjusting member is detachably attached; and a first engagement portion, and the second rotating body includes a second engagement portion engageable with the first engagement portion.

15 Claims, 17 Drawing Sheets

(56) References Cited

FOREIGN PATENT DOCUMENTS

| WO | 2007/046424 A1 | 4/2007 |
| WO | 2020/255289 A1 | 12/2020 |

OTHER PUBLICATIONS

International Search Report dated Mar. 22, 2022, Application No. PCT/JP2021/048412; 4 pages.

Panasonic Corporation, "Direct Drive Digital Turntable SL-DZ1200 Product Overview", retrieval of data: Nov. 22, 2021, URL:https://panasonic.jp/audio/p-db/SL-DZ1200.html; discussed in the specification, 3 pages.

* cited by examiner

F I G. 1
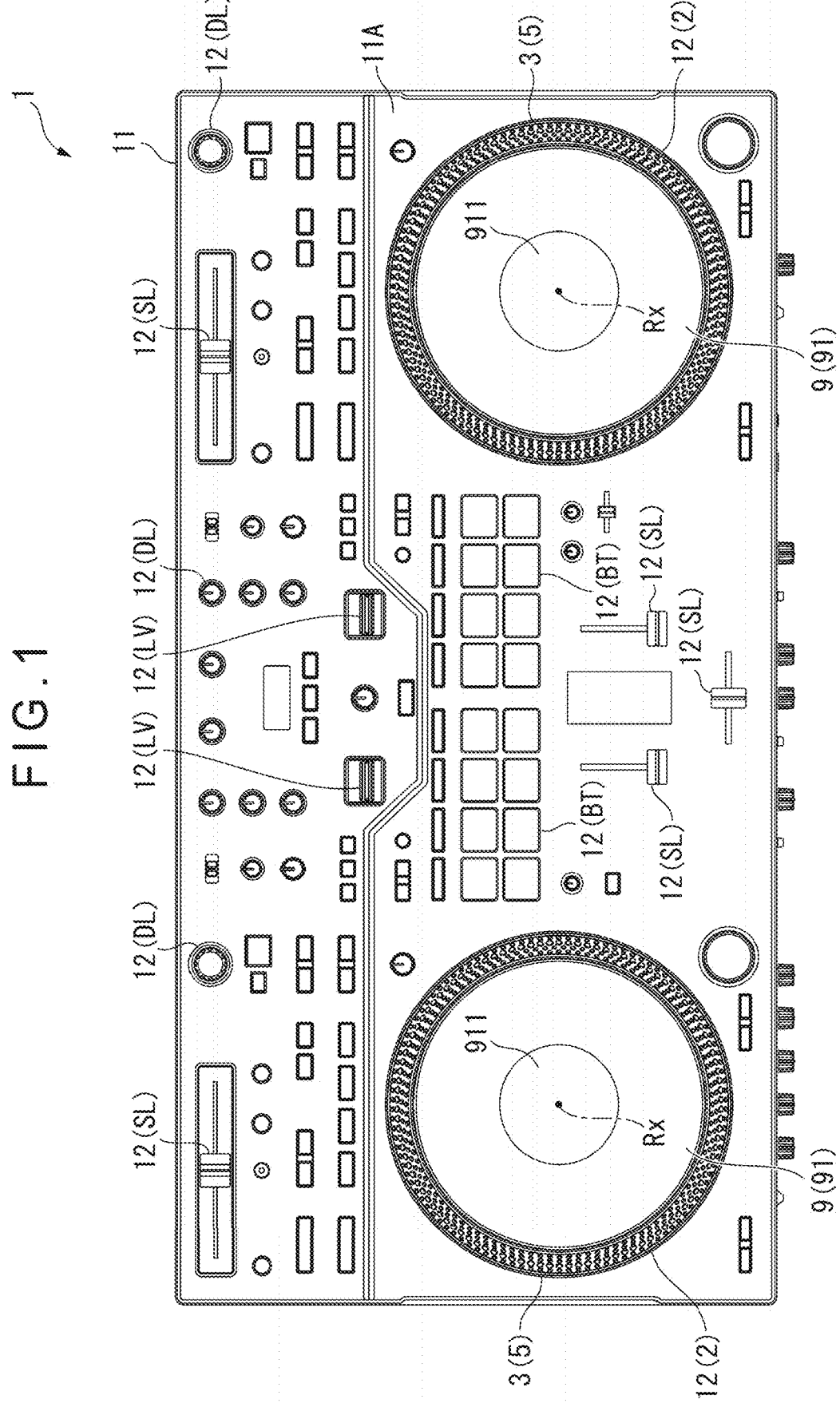

F I G . 4
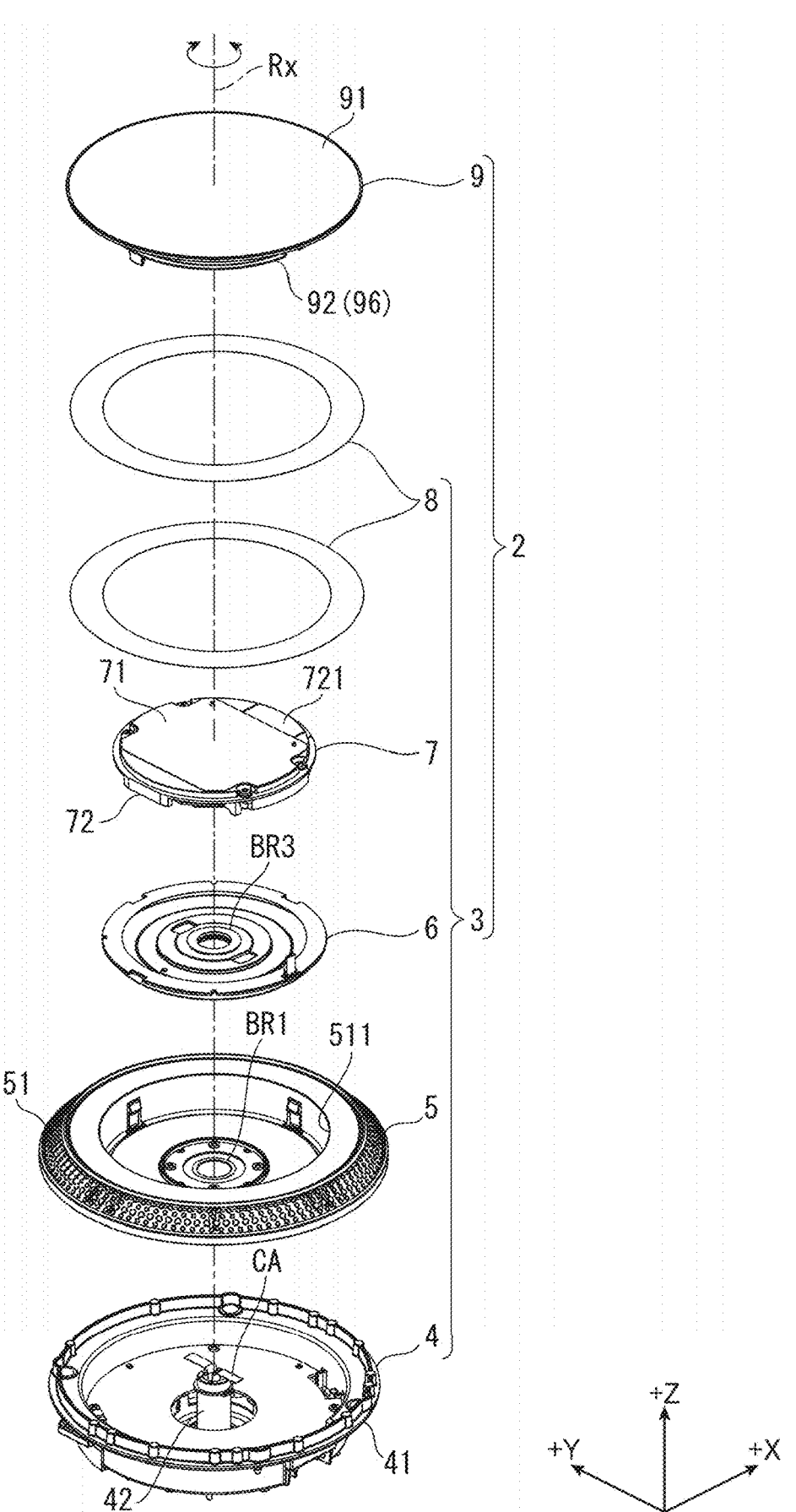

F I G . 8
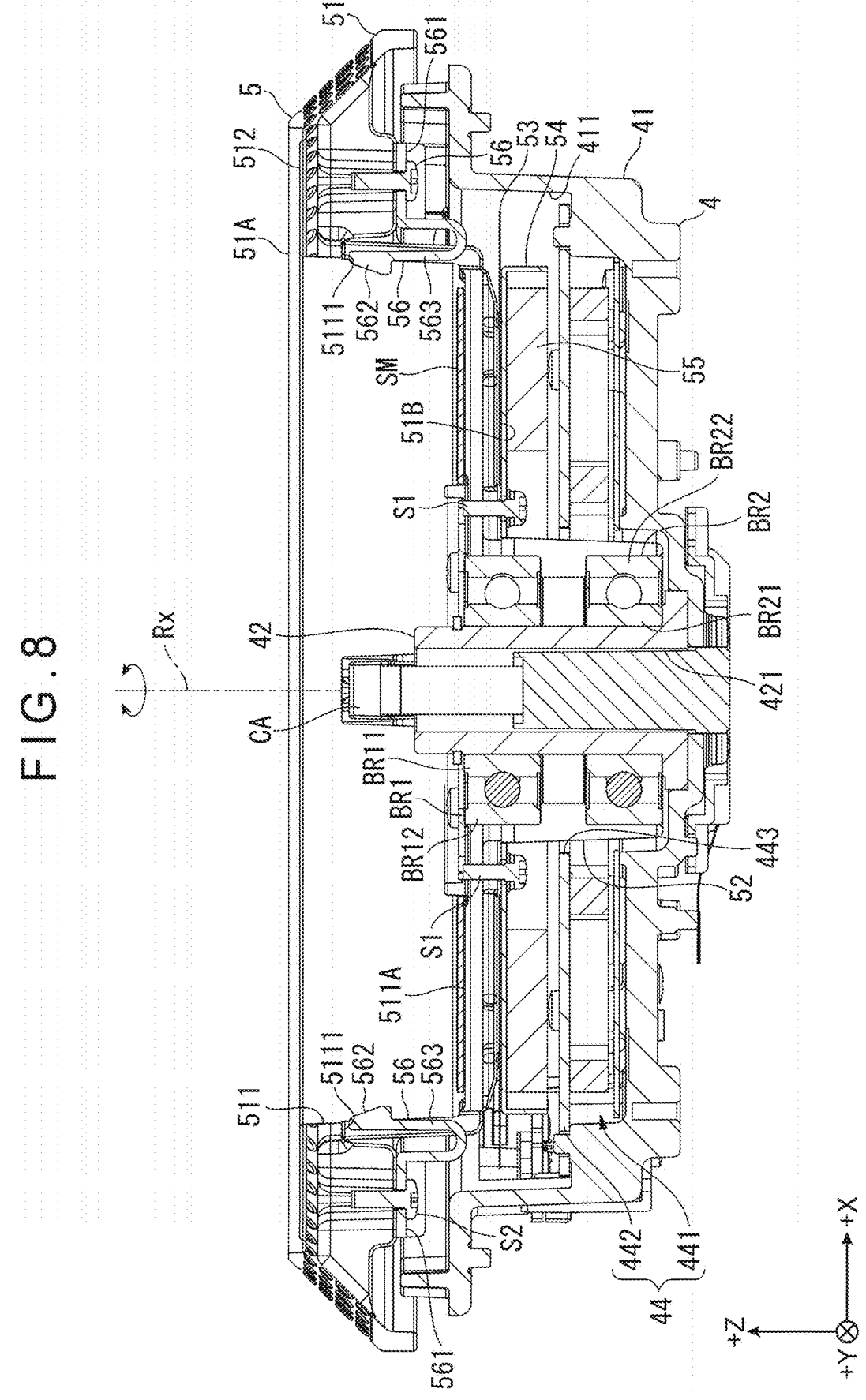

7
71
723
721
72
CA

+Z
+Y
+X

ROTARY OPERATOR, OPERATION DEVICE, AND ACOUSTIC CONTROL DEVICE

TECHNICAL FIELD

The present invention relates to a rotary operator, an operation device, and a sound control device.

BACKGROUND ART

DJ equipment including a jog wheel has been known as a sound control device (see, for instance, Non-Patent Literature 1).

The jog wheel of the DJ equipment described in Non-Patent Literature 1 includes a display provided at a center portion of the jog wheel, a platter, and a vinyl. The platter is disposed to surround a circumference of the display and rotatable around a rotation axis. The vinyl is formed in an annular shape surrounding the circumference of the display and disposed on the platter. A slip disc is fixed to a top surface of the vinyl. The vinyl rotates along with the platter coaxially with the platter and in the same direction as the platter, and is also rotatable clockwise or counterclockwise independently of the platter. The DJ equipment adjusts a playback direction and a playback speed of an inputted music in accordance with a rotation direction and a rotation speed of the vinyl and plays the music.

CITATION LIST

Non-Patent Literature(s)

Non-Patent Literature 1: Panasonic Corporation, "DIRECT DRIVE DIGITAL TURNTABLE SL-DZ1200 Product Overview", [retrieval of data: Nov. 22, 2021], URL: https://panasonic.jp/audio/p-db/SL-DZ1200.html

SUMMARY OF THE INVENTION

Problem(s) to be Solved by the Invention

The vinyl of the DJ equipment described in Non-Patent Literature 1 is, however, rotatably coupled to the platter, and thus it is not easy for a user to remove the vinyl from the platter. Therefore, it is difficult to adjust friction force between the platter and the vinyl.

In regard to the above concern, preferences in terms of the friction force between the platter and the vinyl, that is, preferences in terms of operational feeling of the vinyl, are likely to be variable, leading to a demand for a configuration that enables the friction force adjustment.

Means for Solving the Problem(s)

A rotary operator according to a first aspect of the invention includes: a first rotating body rotatable around an imaginary rotation axis; a second rotating body being detachably attached, the second rotating body being configured to rotate integrally with the first rotating body and also being rotatable around the rotation axis independently of the first rotating body; and a friction adjusting member being covered by the second rotating body as viewed from a side of the second rotating body with respect to the first rotating body and being configured to adjust friction force between the first rotating body and the second rotating body, in which the first rotating body includes: an installation portion to which the friction adjusting member is detachably attached; and a first engagement portion, and the second rotating body includes a second engagement portion engageable with the first engagement portion.

An operation device according to a second aspect of the invention includes the rotary operator according to the first aspect.

A sound control device according to a third aspect of the invention includes the operation device according to the second aspect.

BRIEF DESCRIPTION OF DRAWINGS

FIG. 1 is a plan view of a sound control device according to an exemplary embodiment.

FIG. 4 is an exploded perspective view of the rotary operator according to the exemplary embodiment.

FIG. 8 is a cross-sectional view of the base member and the first rotating body according to the exemplary embodiment.

DESCRIPTION OF EMBODIMENT(S)

Figure 2:
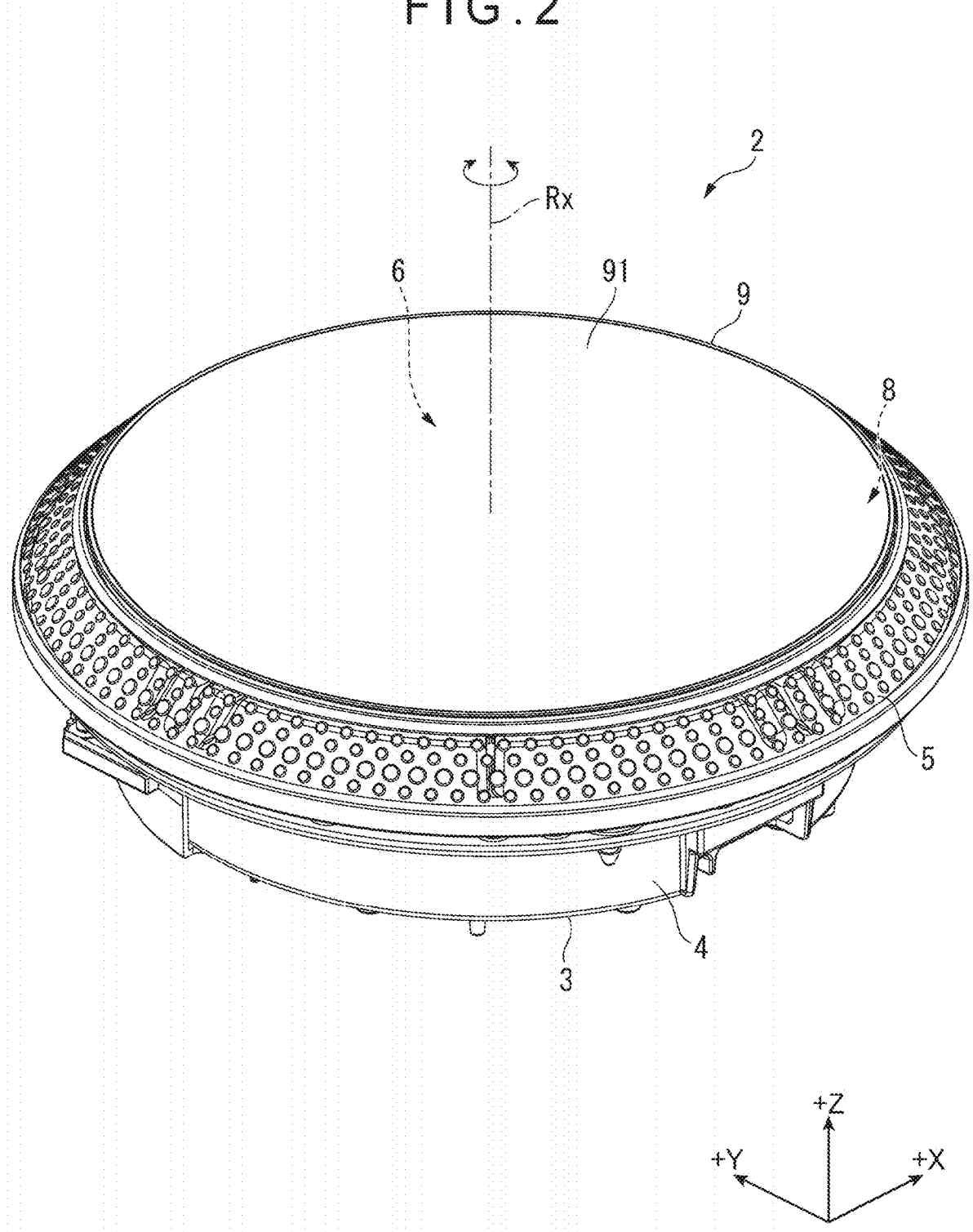
FIG. 2 is a perspective view of a rotary operator according to the exemplary embodiment.

Referring to the drawings, an exemplary embodiment of the invention will be described below.

Exterior Configuration of Sound Control Device

FIG. 1 is a plan view of a sound control device 1 according to the exemplary embodiment. In FIG. 1, in consideration of viewability, only a part of a plurality of buttons BT, a part of a plurality of levers LV, a part of a plurality of sliders SL, and a part of a plurality of dials DL of the sound control device 1 are labeled with reference signs.

As illustrated in FIG. 1, the sound control device 1 according to the exemplary embodiment includes a casing 11, a plurality of operators 12 provided for the casing 11, and a controller (not illustrated) provided within the casing 11.

The controller outputs an operation signal for adjusting a playback state of inputted music or outputs an audio signal of music whose playback state is adjusted in response to a user's operation to the plurality of operators 12. That is, the sound control device 1 has a function as an operation device to send an operation signal corresponding to a user's operation to the operators 12 to a music playback device (not illustrated) connected to the sound control device 1. In other words, the sound control device 1 includes an operation device including a later-described rotary operator 2. Alternatively, the sound control device 1 has a function as a music playback device to send an audio signal of music played in accordance with an operation to the operators 12 to an audio output device (not illustrated), such as a speaker connected to the sound control device 1.

Configuration of Operator

The plurality of operators 12 are an operation means provided for a top surface 11A of the casing 11. The top surface 11a faces a user. The plurality of operators 12 include two rotary operators 2, the plurality of buttons BT, the plurality of levers LV, the plurality of sliders SL, and the plurality of dials DL. In response to a user' operation, each operator 12 outputs an operation signal corresponding to an operation state to the controller.

Configuration of Rotary Operator

Figure 3:
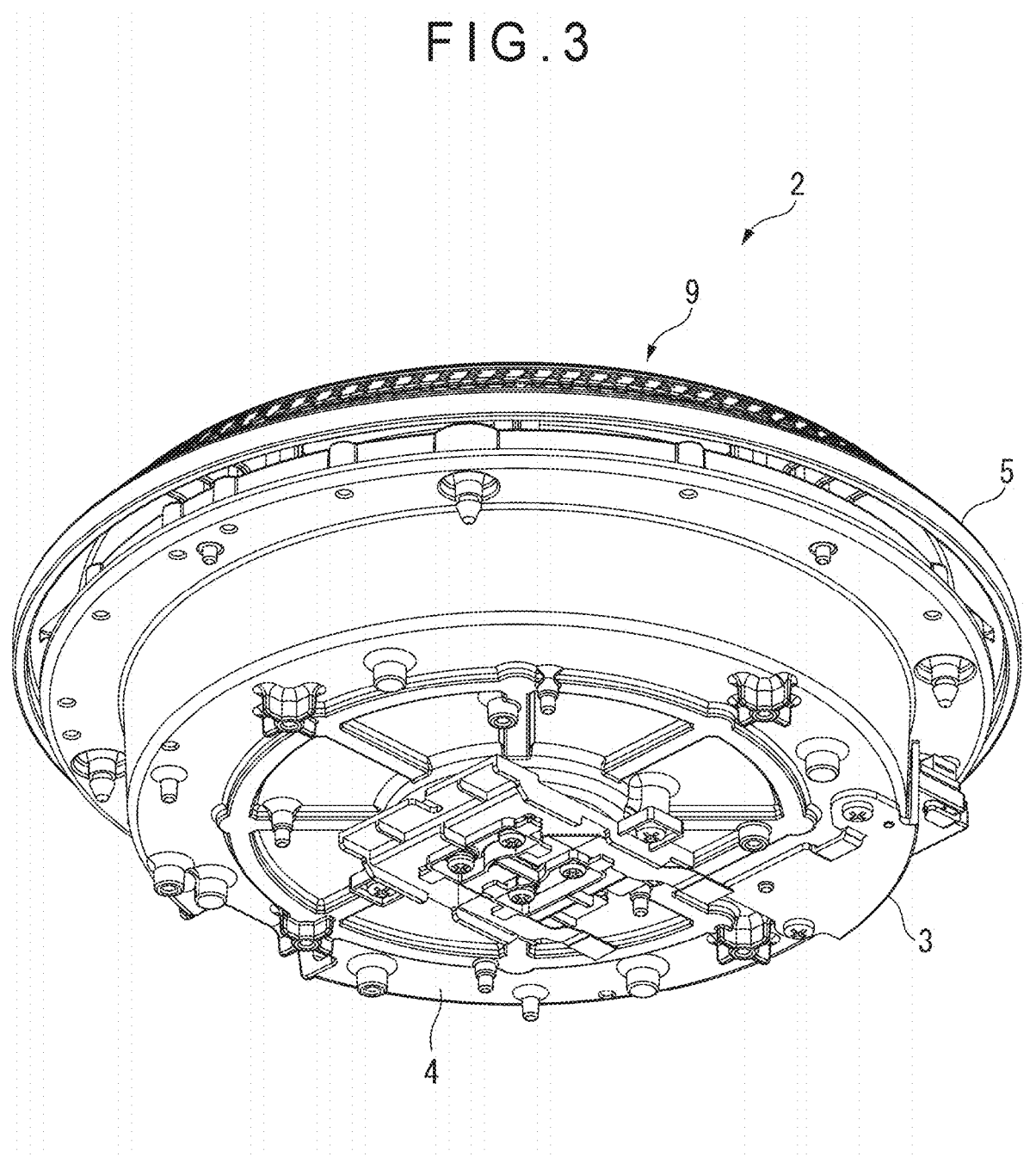
FIG. 3 is another perspective view of the rotary operator according to the exemplary embodiment.
Figure 5:
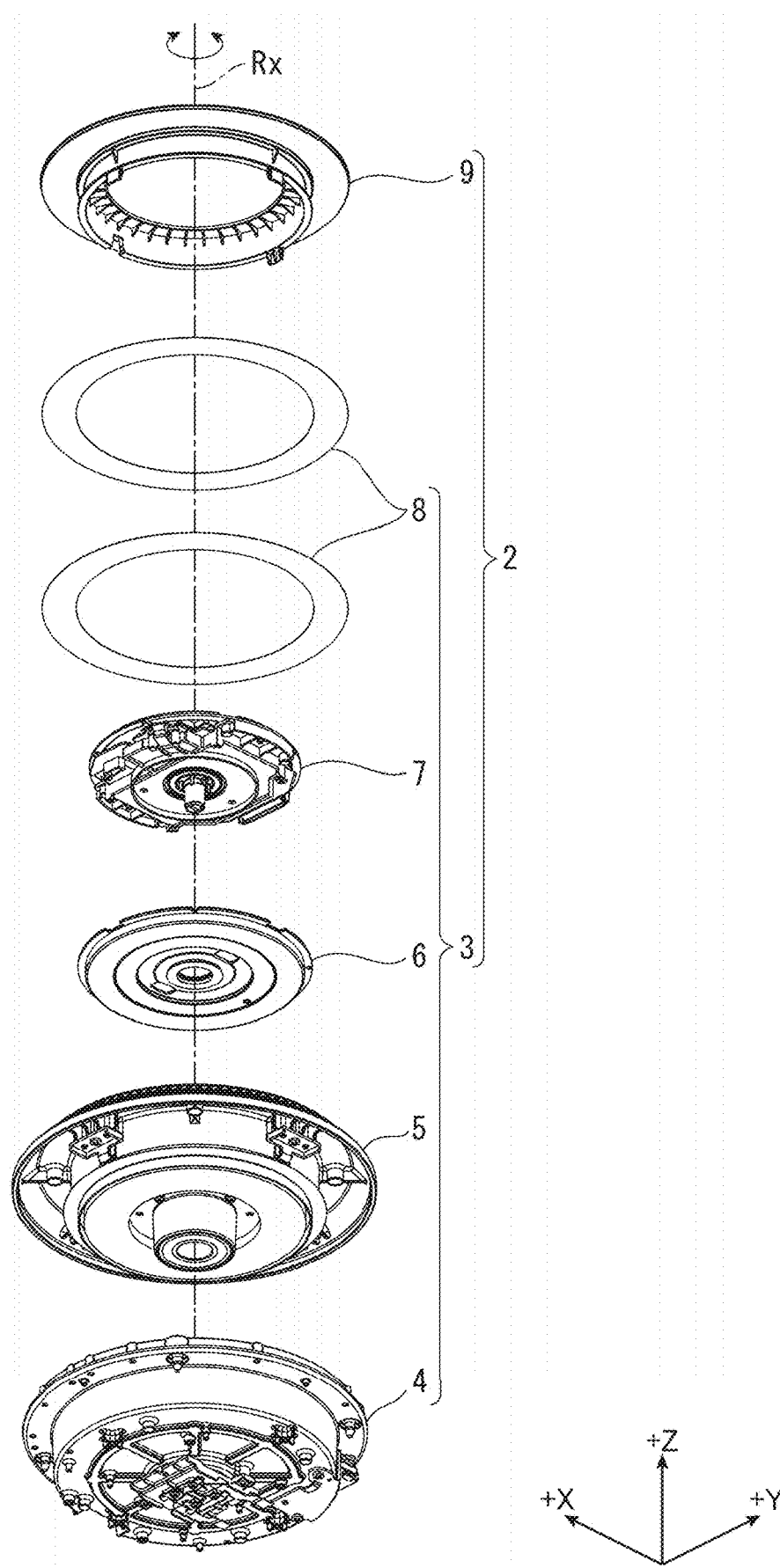
FIG. 5 is another exploded perspective view of the rotary operator according to the exemplary embodiment.

FIG. 2 is a perspective view of the rotary operator 2 as viewed from a top-surface side. FIG. 3 is a perspective view of the rotary operator 2 as viewed from a bottom-surface side. FIG. 4 is an exploded perspective view of the rotary operator 2 as viewed from the top-surface side. FIG. 5 is an exploded perspective view of the rotary operator 2 as viewed from the bottom-surface side.

As illustrated in FIG. 2 to FIG. 5, the rotary operator 2 includes an operator body 3 and a second rotating body 9. The operator body 3 includes a base member 4, a first rotating body 5, a plate 6, a display 7, and a friction adjusting member 8. The rotary operator 2 is a jog wheel, so-called a motorized jog wheel, in which the first rotating body 5 and the second rotating body 9 rotate around a rotation axis Rx during the use of the rotary operator 2.

In the following description, three directions orthogonal to each other are defined as a +X direction, a +Y direction, and a +Z direction. The +Z direction is, for instance, a direction from a bottom surface toward the top surface of the casing 11. The +Z direction is a direction toward the second rotating body 9 with respect to the first rotating body 5 described later. A right direction defined in a case where an upward direction and the +Y direction are in alignment as viewed from the +Z direction is referred to as the +X direction. Although the illustration is omitted, a direction opposite to the +X direction is defined as a −X direction, a direction opposite to the +Y direction is defined as a −Y direction, and a direction opposite to the +Z direction is defined as a −Z direction.

That is, the top-surface side of the rotary operator 2 corresponds to the +Z direction and the bottom-surface side thereof corresponds to the −Z direction. In the rotary operator 2, the base member 4, the first rotating body 5, the plate 6, the display 7, the friction adjusting member 8, and the second rotating body 9 are arranged toward the +Z direction.

Configuration of Base Member

Figure 6:
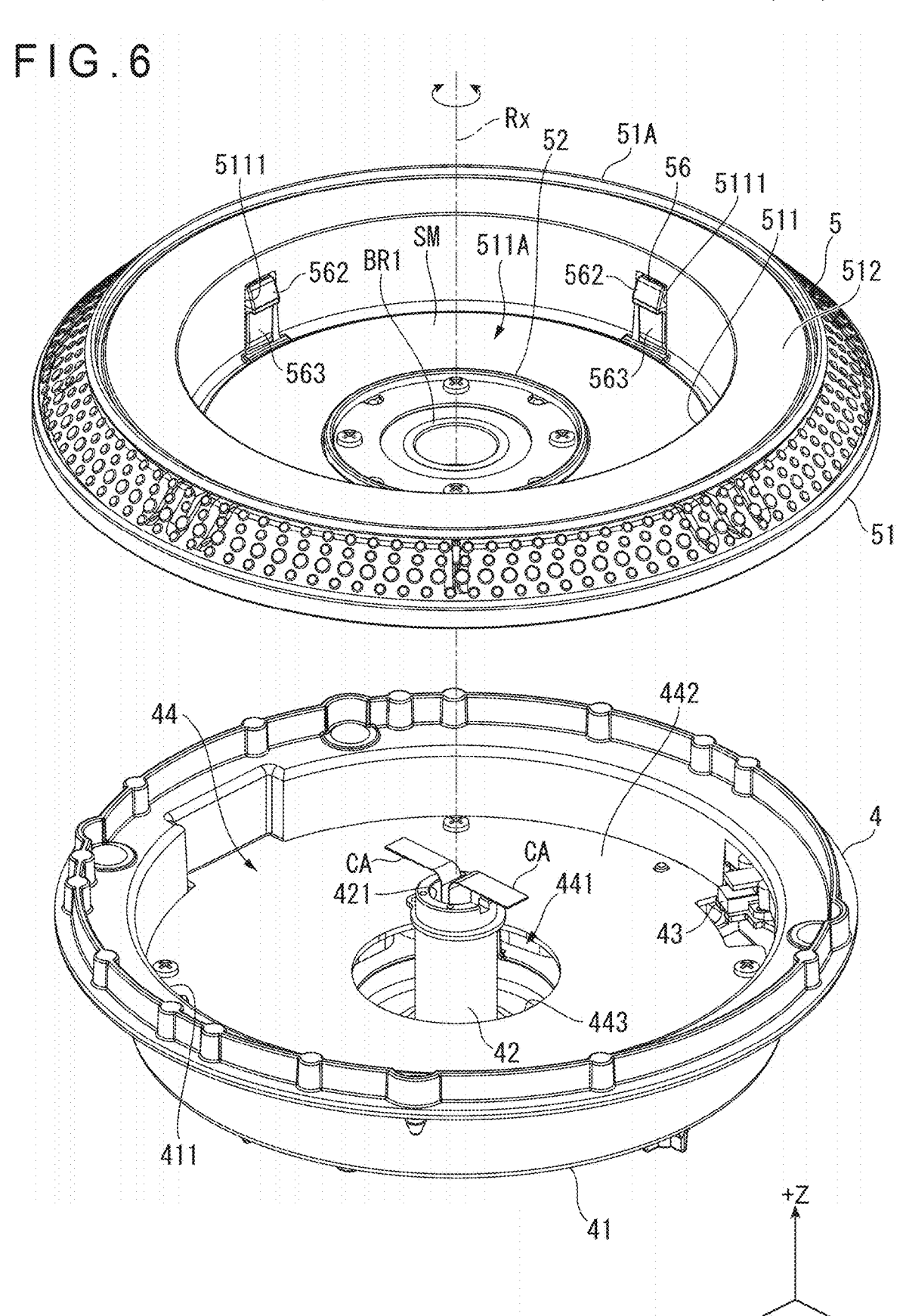
FIG. 6 is a perspective view of a base member and a first rotating body according to the exemplary embodiment.

FIG. 6 is a perspective view of the base member 4 and the first rotating body 5 as viewed from the +Z direction.

The base member 4, which is fixed within the casing 11, supports the first rotating body 5 and the second rotating body 9 in a manner for the first rotating body 5 and the second rotating body 9 to be rotatable around the imaginary rotation axis Rx and also supports the display 7. As illustrated in FIG. 5 and FIG. 6, the base member 4 includes a housing 41, a shaft 42, a first detector 43, and a drive device 44.

The housing 41, which is formed in a disc shape, serves as an exterior of the rotary operator 2 in the −Z direction. The housing 41 has a recess 411 opening in the +Z direction.

The recess 411 is recessed in the −Z direction from a surface in the +Z direction and is formed substantially in a circular shape as viewed from the +Z direction. The shaft 42, the first detector 43, and the drive device 44 are disposed within the recess 411.

The shaft 42 stands up substantially in a cylindrical shape in the +Z direction from a position substantially at a center portion of the recess 411. The shaft 42 supports the first rotating body 5 and the second rotating body 9 in a manner for the first rotating body 5 and the second rotating body 9 to be rotatable, and also supports the display 7 in a manner for the display 7 not to rotate. That is, the shaft 42 serves as the rotation axis Rx of the first rotating body 5 and the second rotating body 9. An 20 extended line of a longitudinal axis of the shaft 42 along the +Z direction is in alignment with the rotation axis Rx.

The shaft 42 has a through hole 421 penetrating through the shaft 42 in the +Z direction. A cable CA, which is connected to the display 7, passes through the through hole 421. That is, the cable CA has one end connected to the display 7 fixed to the shaft 42 and the other end passing through the through hole 421 in the −Z direction to extend outside the rotary operator 2.

The first detector 43 is disposed in an interior surface of the recess 411. The first detector 43 detects a rotation state of the first rotating body 5. Specifically, the first detector 43 detects a rotation direction and a rotation speed of the first rotating body 5. The rotation state of the first rotating body 5 detected by the first detector 43 is output to the above-described controller. In the exemplary embodiment, the first detector 43 includes a photointerrupter that detects light passing through a slit of a rotation detecting disc 53 (see FIG. 7) of the first rotating body 5 to detect a rotation state of the first rotating body 5. However, the first detector 43 may have any other configuration as long as the first detector 43 can detect the rotation state of the first rotating body 5.

The drive device 44, which is provided in a bottom of the recess 411, rotates the first rotating body 5 under the control of the controller. That is, the rotary operator 2 includes the drive device 44 that rotates the first rotating body 5. In the exemplary embodiment, the drive device 44 includes a coil 441 and a board 442.

A plurality of coils 441 are provided around the shaft 42.

The board 442 is provided within the recess 411 to cover the plurality of coils 441 from the +Z direction. Although a detailed illustration is omitted, the board 442 supports the plurality of coils 441 and circuit elements such as a Hall element. The board 442 is formed in an annular shape as viewed from the +Z direction. The board 442 has an opening 443 at a center portion of the board 442 as viewed from the +Z direction. The shaft 42 penetrates through the opening 443 along the +Z direction to be exposed in the +Z direction with respect to the board 442.

The invention, however, is not limited to such a configuration. The configuration of the drive device 44 is not particularly limited as long as the first rotating body 5 is rotatable around the rotation axis Rx.

Configuration of First Rotating Body

Figure 7:
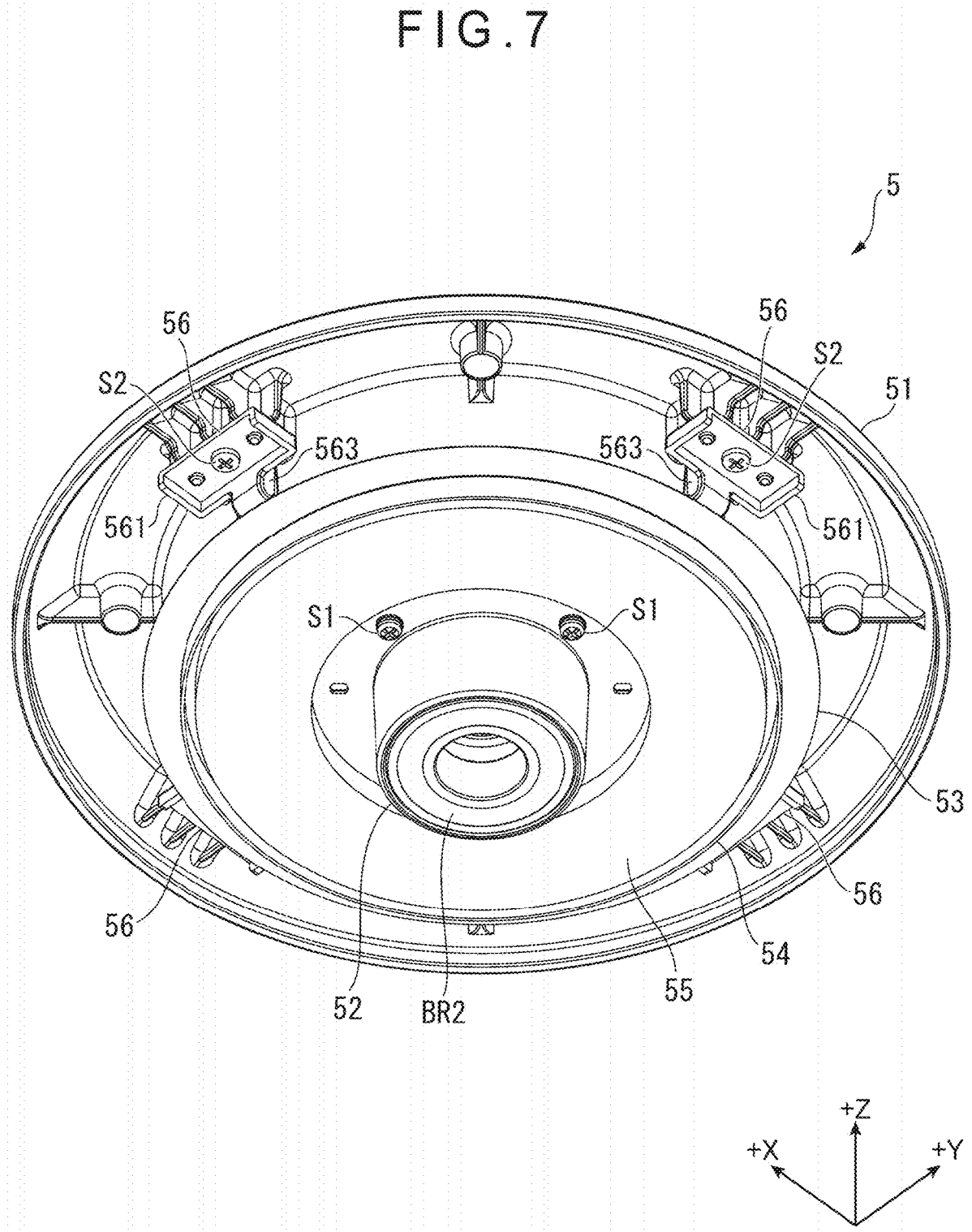
FIG. 7 is another perspective view of the first rotating body according to the exemplary embodiment.

FIG. 7 is a perspective view of the first rotating body 5 as viewed from the −Z direction. FIG. 8 illustrates a cross section of the base member 4 and the first rotating body 5 along an XZ plane.

The first rotating body 5, which is so-called a platter, is attached to the shaft 42 rotatably around the rotation axis Rx with bearings BR1, BR2 in between. The first rotating body 5 is disposed to cover the base member 4 from the +Z direction as illustrated in FIG. 3 to FIG. 5. The first rotating body 5 includes a body 51 as illustrated in FIG. 6 to FIG. 8. The first rotating body 5 further includes a cylinder 52, the rotation detecting disc 53, a holding member 54, a magnet 55, and engagement pieces 56 as illustrated in FIG. 7 and FIG. 8.

The body 51 is formed in a conical trapezoidal shape as illustrated in FIG. 6. That is, the body 51 is formed in a circular shape as viewed from the +Z direction and has an outer diameter increased toward the −Z direction. The body 51 has a recess 511 and an installation portion 512.

The recess 511 is provided in a position including the rotation axis Rx as viewed from the +Z direction. The recess 511 is recessed in the −Z direction from a surface 51A in the +Z direction and is formed in a circular shape as viewed from the +Z direction. The cylinder 52 projecting in the −Z direction is provided at a center portion of a bottom of the recess 511, and an interior surface of the recess 511 is provided with a plurality of openings 5111. A later-described claw 562 of the engagement piece 56 is exposed from one of the openings 5111. The recess 511 has a bottom surface 511A on which a sheet member SM is disposed. The sheet member SM reduces a frictional resistance of the plate 6 to the first rotating body 5. A material of the sheet member SM may be exemplified by high-density polyethylene (HDPE). The invention, however, is not limited thereto, and the material of the sheet member SM may be changed as appropriate.

The installation portion 512 is provided in the surface 51A in the +Z direction and outside the recess 511 as viewed from the +Z direction. That is, the installation portion 512 is provided along a circumferential edge of the first rotating body 5 centered at the rotation axis Rx. Specifically, the installation portion 512 is in a form of a recess recessed in the −Z direction from the surface 51A. The installation portion 512 is annularly provided along a circumferential direction centered at the rotation axis Rx. The friction adjusting member 8 is detachably attached to the installation portion 512.

The cylinder 52 is formed in a cylindrical shape as illustrated in FIG. 7. As illustrated in FIG. 8, the bearings BR1 and BR2 are provided in series within the cylinder 52 along the +Z direction at a predetermined interval. Each of the bearings BR1 and BR2 is a radial bearing, and is a ball bearing (a deep groove ball bearing) in the exemplary embodiment. Respective inner races BR11 and BR21 of the bearings BR1 and BR2 are fixed to a circumferential surface of the shaft 42, and respective outer races BR12 and BR22 thereof are fixed to the cylinder 52. By virtue of such bearings BR1 and BR2, the first rotating body 5 is rotatably supported by the shaft 42. Each of the bearings BR1 and BR2 is not limited to a ball bearing and may be any other radial bearing such as an angular contact ball bearing, or a sliding bearing.

As illustrated in FIG. 7, the rotation detecting disc 53 is a circular plate member as viewed from the −Z direction. The rotation detecting disc 53 is fixed to a surface 51B in the −Z direction of the body 51, as illustrated in FIG. 8.

Although not illustrated, the rotation detecting disc 53 has a plurality of slits that radially extend around the rotation axis Rx and are arranged along the circumferential direction centered at the rotation axis Rx. A part of a circumferential edge of the rotation detecting disc 53 provided with the plurality of slits is inserted in the photointerrupter of the first detector 43. This enables the rotation state of the first rotating body 5 to be detected by the first detector 43.

The holding member 54 is disposed in the −Z direction with respect to the rotation detecting disc 53 and fixed to the surface 51B along with the rotation detecting disc 53 with a screw S1, as illustrated in FIG. 7 and FIG. 8. The holding member 54 is a circular plate with the magnet 55 held on a surface in the −Z direction.

The magnet 55 is provided on the surface of the holding member 54 facing the −Z direction. The magnet 55 works along with the drive device 44 to rotate the first rotating body 5 around the rotation axis Rx.

The engagement piece 56, which corresponds to a first engagement portion, is engaged with the second rotating body 9 to inhibit the second rotating body 9 from coming off from the operator body 3. As illustrated in FIG. 6, a plurality of such engagement pieces 56 are arranged at regular intervals along the circumferential direction centered at the rotation axis Rx as viewed from the +Z direction. In the exemplary embodiment, four engagement pieces 56 are provided. Each engagement piece 56 is formed substantially in an L shape, as illustrated in FIG. 8. The engagement piece 56 includes an attachment portion 561, the claw 562, and an elastic portion 563.

The attachment portion 561 is a portion along an XY plane. A screw S2 is inserted in the attachment portion 561. The engagement piece 56 is attached to the body 51 by fixing the screw S2 to a circumferential portion of the surface 51B of the body 51.

The claw 562 is formed in a shape of a claw. The claw 562 is exposed within the recess 511 through the opening 5111. The claw 562 is inserted in an engagement portion 96 of the second rotating body 9 to inhibit the second rotating body 9 from coming off from the first rotating body 5, that is, to inhibit the second rotating body 9 from coming off from the operator body 3.

The elastic portion 563, which is provided between the attachment portion 561 and the claw 562, is elastically deformable toward the attachment portion 561. In attaching the second rotating body 9 to the operator body 3, the elastic portion 563 elastically deforms toward the attachment portion 561 as the second rotating body 9 presses the claw 562 outward in a radial direction centered at the rotation axis Rx, which permits the claw 562 to move toward the attachment portion 561. In contrast, in a case where the pressing force of the second rotating body 9 to the claw 562 is released, the elastic portion 563 causes the claw 562 to move opposite the attachment portion 561. This maintains a state in which the claw 562 is engageable with the second rotating body 9.

Configuration of Plate

Figure 9:
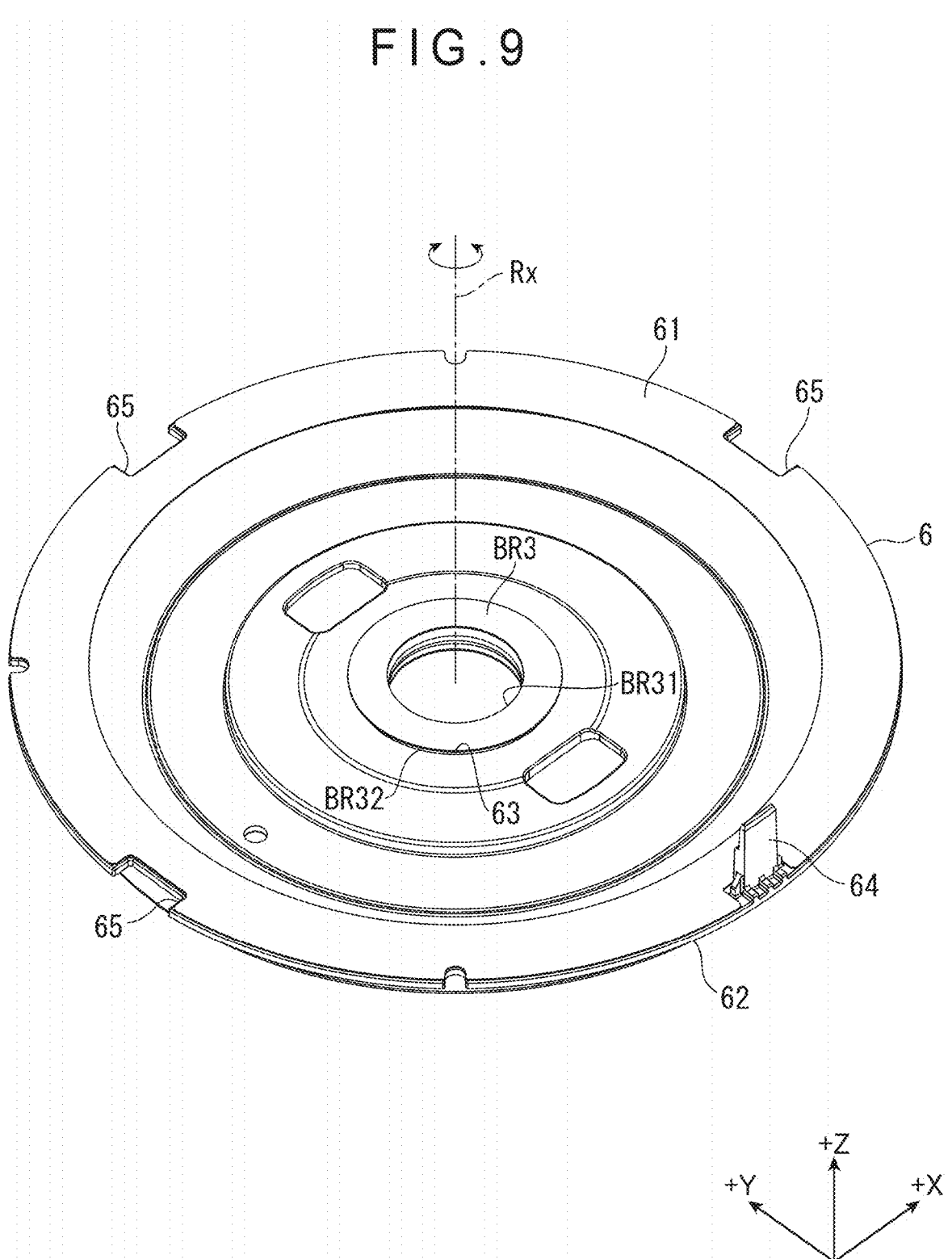
FIG. 9 is a perspective view of a plate according to the exemplary embodiment.
Figure 10:
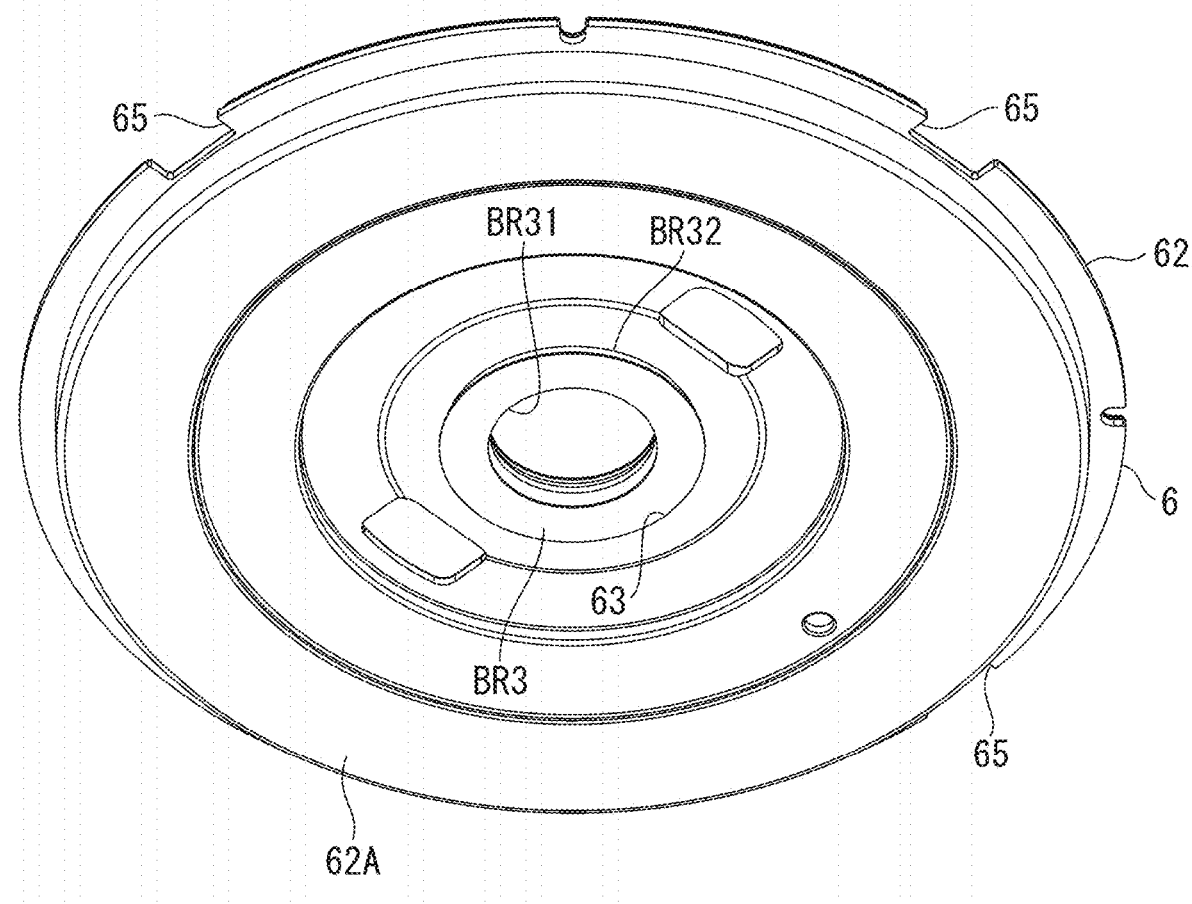
FIG. 10 is another perspective view of the plate according to the exemplary embodiment.

FIG. 9 is a perspective view of the plate 6 as viewed from the +Z direction. FIG. 10 is a perspective view of the plate 6 as viewed from the −Z direction.

The plate 6 is substantially in a form of a circular plate, as illustrated in FIG. 9 and FIG. 10. The plate 6 is attached to the shaft 42 to be rotatable around the rotation axis Rx and disposed within the recess 511 of the first rotating body 5. The plate 6 is coupled to the second rotating body 9 and rotatable around the rotation axis Rx along with the second rotating body 9 and independently of the first rotating body 5.

The plate 6 includes a rotation detecting disc 61 as illustrated in FIG. 9, and further includes a support member 62 as illustrated in FIG. 9 and FIG. 10.

As illustrated in FIG. 9, the rotation detecting disc 61 is formed in an annular shape as viewed from the +Z direction and fixed to the support member 62. A plurality of slits (not illustrated) are provided for a portion of the rotation detecting disc 61 near an inner edge of a surface in the +Z direction.

Similarly to the plurality of slits of the rotation detecting disc 53, the plurality of slits of the rotation detecting disc 61 are radially provided around the rotation axis Rx and arranged along the circumferential direction centered at the rotation axis Rx. The portion of the rotation detecting disc 61 provided with the plurality of slits is disposed at a position overlapping with a later-described second detector 73 (see FIG. 12 and FIG. 13) as viewed from the +Z direction. With use of the plurality of slits, the second detector 73 detects a rotation state of the plate 6 and, consequently, a rotation state of the second rotating body 9. This will be described later in detail.

The support member 62 in a state of supporting the rotation detecting disc 61 is rotatably supported by the shaft 42. The support member 62 has an opening 63, a projection 64, and a plurality of cuts 65.

The opening 63, which has a circular shape, is provided at a center portion of the plate 6 as viewed from the +Z direction. A bearing BR3 is provided within the opening 63. An inner race BR31 of the bearing BR3 is fixed to the shaft 42 (see FIG. 6) and an outer race BR32 thereof is fixed to an inner edge of the opening 63. Fixing the inner race BR31 of the bearing BR3 to the shaft 42 allows the plate 6 to be rotatably attached to the shaft 42. A sliding bearing is employed as the bearing BR3 in the exemplary embodiment. The invention, however, is not limited thereto, and a rolling bearing may be employed as the bearing BR3.

The projection 64 projects in the +Z direction from a circumferential edge of the plate 6, as illustrated in FIG. 9. In coupling the plate 6 to the second rotating body 9, the projection 64 is inserted into a recess 99 of the second rotating body 9 from the −Z direction.

Each of the cuts 65 is provided in the circumferential edge of the plate 6. In coupling the plate 6 to the second rotating body 9, projections 98 of the second rotating body 9 are inserted into the respective cuts 65 from the +Z direction.

The single projection 64 and the plurality of cuts 65 are provided in the circumferential edge of the plate 6 at regular intervals along the circumferential direction centered at the rotation axis Rx. In the exemplary embodiment, three cuts 65 are provided. The projection 64 is disposed at one of four portions equally spaced in the circumferential direction centered at the rotation axis Rx, and the cuts 65 are provided at the remaining three portions.

Such a support member 62 has a surface 62A in the −Z direction (i.e., a surface in the −Z direction of the plate 6), which is in contact with the bottom surface 511A (see FIG. 6) of the recess 511 of the first rotating body 5 with the sheet member SM (see FIG. 6) in between. This causes the plate 6 to rotate integrally with the first rotating body 5 during rotation of the first rotating body 5 around the rotation axis Rx. In a case where the second rotating body 9, which is coupled to the support member 62, is rotated around the rotation axis Rx, the plate 6 rotates integrally with the second rotating body 9 while sliding on the bottom surface 511A. However, the invention is not limited thereto, and the sheet member SM is not indispensable. That is, the surface 62A may be in direct contact with the bottom surface 511A.

Configuration of Display

An image corresponding to image information input from the controller is displayed on the display 7. The display 7 is disposed at a center portion of the rotary operator 2 in the +Z direction. Specifically, the display 7 is disposed within the recess 511 of the first rotating body 5 at a position in the +Z direction with respect to the plate 6 so that the display 7 overlaps with the rotation axis Rx as viewed from the +Z direction, as illustrated in FIG. 4 and FIG. 5. An outer diameter of the display 7 as viewed from the +Z direction is smaller than an outer diameter of the plate 6 as viewed from the +Z direction.

Such a display 7 is fixed to the shaft 42 and rotation of the display 7 around the rotation axis Rx is controlled.

Figure 11:
FIG. 11 is a perspective view of a display according to the exemplary embodiment.
Figure 12:
FIG. 12 is another perspective view of the display according to the exemplary embodiment.

FIG. 11 is a perspective view of the display 7 as viewed from the +Z direction. FIG. 12 is a perspective view of the display 7 as viewed from the −Z direction.

As illustrated in FIG. 11 and FIG. 12, the display 7 includes a display panel 71, a housing 72, and the second detector 73.

The display panel 71 is connected to the controller through the cable CA and displays an image corresponding to image information input from the controller.

Figure 13:
FIG. 13 is a plan view of the display from which a cover is removed according to the exemplary embodiment.

FIG. 13 is a plan view of the display 7 with a cover 723 removed from a housing body 721 as viewed from the +Z direction.

The housing 72 includes the housing body 721 housing the display panel 71 and the second detector 73 and the cover 723 detachably attached to the housing body 721. With the cover 723 removed from the housing body 721, the second detector 73 provided for the housing body 721 is exposed in the +Z direction, as illustrated in FIG. 13.

The housing body 721 has a cylindrical fixing portion 722 projecting in the −Z direction from a center position as viewed from the −Z direction, as illustrated in FIG. 12. The fixing portion 722 is fixed to the shaft 42.

The second detector 73 detects the rotation state of the plate 6 as the rotation state of the second rotating body 9 and outputs the detected rotation state of the second rotating body 9 to the above-described controller through the cable CA. In the exemplary embodiment, similarly to the first detector 43, the second detector 73 includes a photointerrupter that detects light passing through a slit of the plate 6 to detect the rotation state of the plate 6 and, consequently, the rotation state of the second rotating body 9. However, the second detector 73 may have any other configuration as long as the second detector 73 can detect the rotation state of the second rotating body 9.

Configuration of Friction Adjusting Member

As illustrated in FIG. 4 and FIG. 5, the friction adjusting member 8 is an annular sheet member installed on the installation portion 512 of the first rotating body 5. When the second rotating body 9 is attached to the operator body 3, the friction adjusting member 8 is disposed between the first rotating body 5 and the second rotating body 9 to adjust friction force between the first rotating body 5 and the second rotating body 9. That is, the friction adjusting member 8 adjusts the friction force during a user's operation to the second rotating body 9.

In the exemplary embodiment, two friction adjusting members 8 are provided. The invention, however, is not limited thereto. The number of the friction adjusting members 8 installed on the installation portion 512 between the first rotating body 5 and the second rotating body 9 may be changed as appropriate. For instance, a larger number of the friction adjusting members 8 are disposed in a case where large friction force is favorable, whereas a smaller number of the friction adjusting members 8 are disposed in a case where small friction force is favorable. That is, friction force resulting from disposing the single friction adjusting member 8 between the first rotating body 5 and the second rotating body 9 is smaller than friction force resulting from disposing the two friction adjusting members 8. Further, in a case of disposing the single friction adjusting member 8, friction force provided by the friction adjusting member 8 with a small thickness is smaller than friction force provided by the friction adjusting member 8 with a large thickness.

In the exemplary embodiment, the friction adjusting member 8 is formed from a resin containing polyethylene terephthalate (PET). The invention, however, is not limited thereto, and the friction adjusting member 8 may have a portion formed from felt or may be formed from any other resin. That is, the material of the friction adjusting member 8 is not limited to PET and may be, for instance, felt. As above, it is possible to adjust the friction force also by disposing the friction adjusting member 8 formed from any other material than PET. Further, it is also possible to adjust the friction force according to the thickness of the friction adjusting member 8. That is, it is possible to adjust the friction force by adjusting the number, the thickness, and the material of the friction adjusting member(s) 8 disposed between the first rotating body 5 and the second rotating body 9.

Configuration of Second Rotating Body

Figure 14:
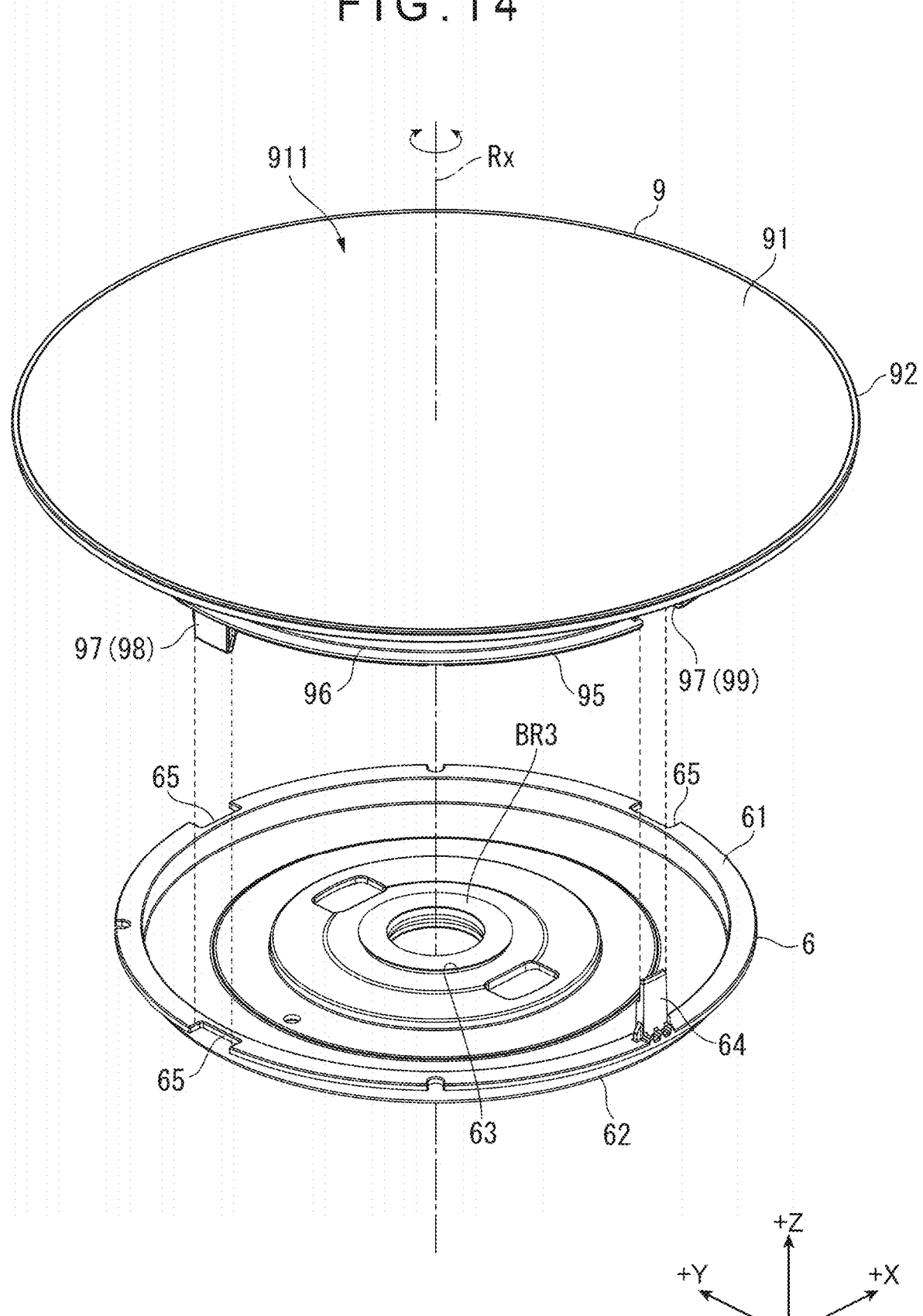
FIG. 14 is a perspective view of the plate and a second rotating body according to the exemplary embodiment.
Figure 15:
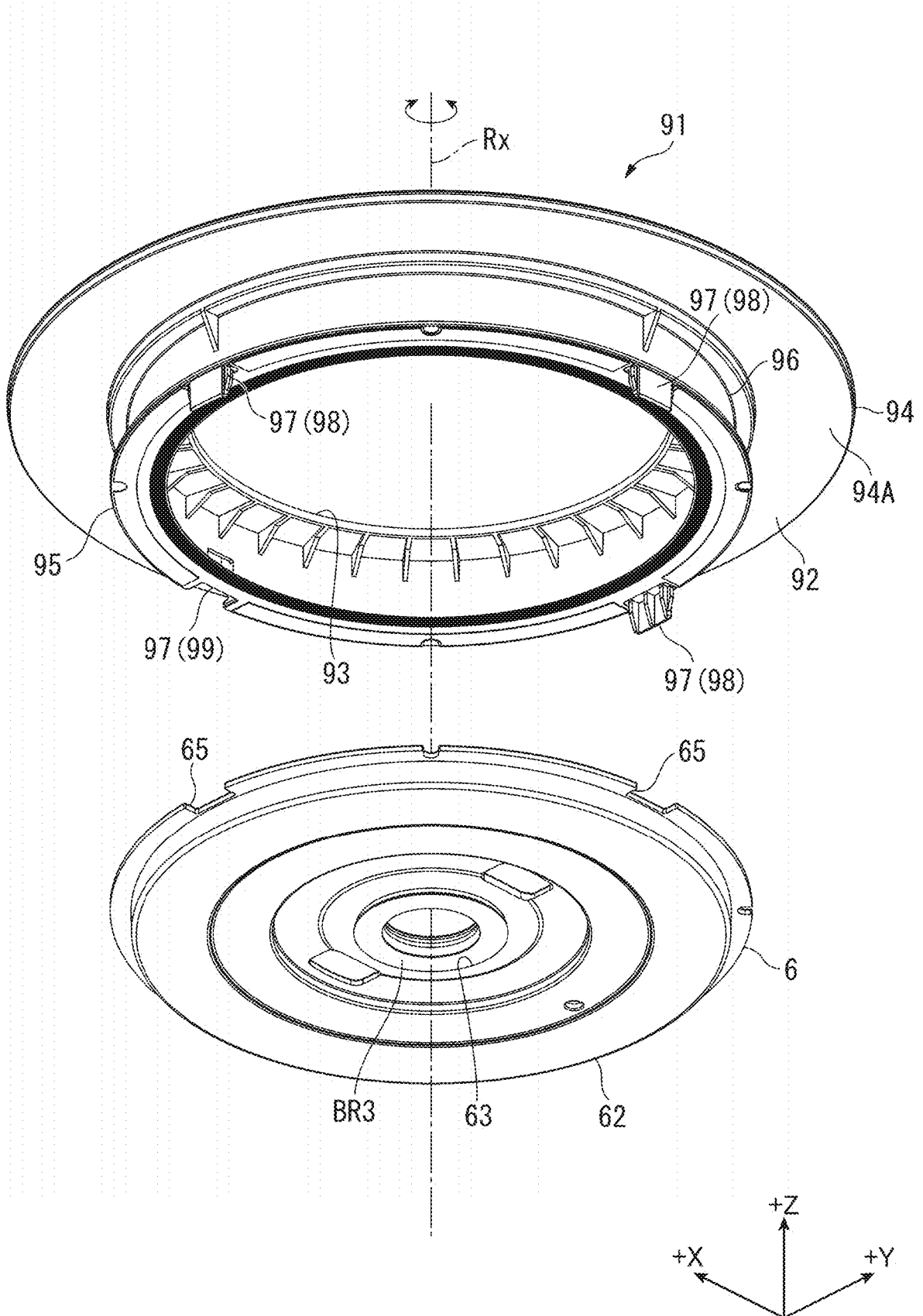
FIG. 15 is another perspective view of the plate and the second rotating body according to the exemplary embodiment.

FIG. 14 is a perspective view of the plate 6 and the second rotating body 9 as viewed from the +Z direction. FIG. 15 is a perspective view of the plate 6 and the second rotating body 9 as viewed from the −Z direction.

The second rotating body 9 is provided for the operator body 3 to be rotatable about the rotation axis Rx. The second rotating body 9 rotates integrally with the first rotating body 5, and in addition, is rotatable clockwise or counterclockwise independently of the first rotating body 5 in response to a user's operation. Specifically, the second rotating body 9, which is mounted on the first rotating body 5 to cover the display 7 and the friction adjusting member 8 from the +Z direction, is in contact with the first rotating body 5 and rotates around the rotation axis Rx along with the first rotating body 5. Further, the second rotating body 9 is coupled to the plate 6 and rotatable around the rotation axis Rx along with the plate 6 and independently of the first rotating body 5.

The second rotating body 9 includes an operation panel 91 and a support member 92.

The operation panel 91 is a portion of the second rotating body 9 that is to be touched by a user rotating the second rotating body 9. The operation panel 91 includes a circular plate defining a surface in the +Z direction of the second rotating body 9 and is attached to the support member 92. When the second rotating body 9 is attached to the operator body 3, the operation panel 91 covers the display 7 and the friction adjusting member 8 from the +Z direction.

The operation panel 91 includes a light-transmitting portion 911 at a center portion of the operation panel 91 as viewed from the +Z direction. That is, the operation panel 91 includes the light-transmitting portion 911 at a position corresponding to the display panel 71 of the display 7 as viewed from the +Z direction. Light output from the display 7 passes through the light-transmitting portion 911. A user is able to observe an image displayed on the display 7 through the light-transmitting portion 911.

The support member 92 supports the operation panel 91 and is coupled to the plate 6. The support member 92 includes an opening 93, a support 94, a cylindrical portion 95, an engagement portion 96, and a coupler 97.

The opening 93 is formed in a circular shape at a center portion of the support member 92 as viewed from the +Z direction.

The support 94 supports the operation panel 91 on a surface in the +Z direction. The support 94 is provided outside the opening 93 as viewed from the +Z direction and formed in an annular shape having substantially the same outer diameter as that of surfaces in the +Z direction of the operation panel 91 and the first rotating body 5. The friction adjusting member 8 is thus covered by the support 94 from the +Z direction when the second rotating body 9 is attached to the operator body 3.

Although not illustrated, in a case where no friction adjusting member 8 is installed on the installation portion 512 of the first rotating body 5 when the second rotating body 9 is coupled to the plate 6, a space is left between a surface 94A of the support 94 and the installation portion 512. In other words, the second rotating body 9 is in contact with the first rotating body 5 with the friction adjusting member 8 in between.

In the exemplary embodiment, the installation portion 512 is connected to the support 94 with the friction adjusting member 8 in between and the installation portion 512 serves as a sliding surface for the friction adjusting member 8 and the second rotating body 9. This makes it possible to decentrally transmit a load generated when a user scratches the operation panel 91 to the first rotating body 5 through the friction adjusting member 8. In addition, it is possible to vary the operational feeling when the second rotating body 9 is rotated relative to the first rotating body 5 depending on the number, thickness, and material of the friction adjusting member(s) 8, as described above.

Figure 16:
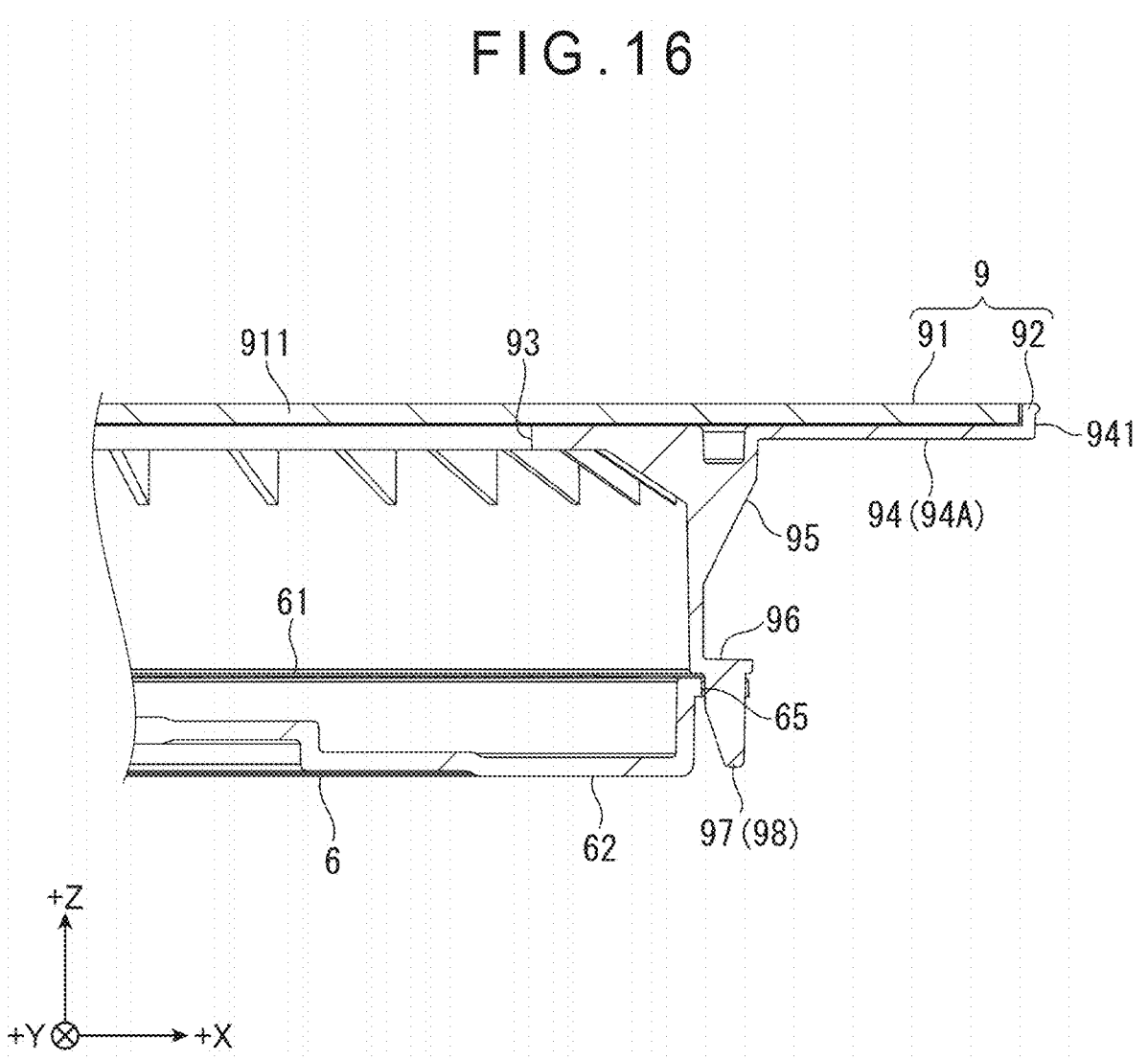
FIG. 16 is an enlarged cross-sectional view of a part of the second rotating body according to the exemplary embodiment.

FIG. 16 is an enlarged cross-sectional view of a part of the second rotating body 9 along the XZ plane.

A circumferential edge of the support 94 is provided with a step 941 as illustrated in FIG. 16. That is, the second rotating body 9 has the step 941 provided for the circumferential edge of the support 94.

The step 941 makes an outer diameter of a portion in the −Z direction of the support member 92 smaller than an outer diameter of a portion in the +Z direction of the support member 92. That is, the step 941 makes the outer diameter of the portion near the first rotating body 5 of the support member 92 smaller than the outer diameter of the portion opposite the first rotating body 5. A user can insert his/her fingernail under such a step portion 941, which facilitates removal of the second rotating body 9 from the operator body 3.

In the exemplary embodiment, the step 941 is provided in the +Z direction with respect to the surface 51A in the +Z direction of the first rotating body 5. A user's fingernail is thus easily caught by the step 941.

The cylindrical portion 95 cylindrically projects in the −Z direction from an inner edge of the opening 93 as illustrated in FIG. 15. When mounting the second rotating body 9 onto the first rotating body 5, the cylindrical portion 95 is inserted into the recess 511 of the first rotating body 5 from the +Z direction. That is, an outer diameter of the cylindrical portion 95 is smaller than an inner diameter of the recess 511 formed in a circular shape as viewed from the +Z direction. When the second rotating body 9 is attached to the operator body 3, the display 7 is disposed inside the cylindrical portion 95.

The engagement portion 96 corresponds to a second engagement portion. The engagement portion 96 is provided for an outer circumferential surface of the cylindrical portion 95 along the circumferential direction centered at the rotation axis Rx. The engagement portion 96, which is a recess along the circumferential direction centered at the rotation axis Rx, is recessed toward the rotation axis Rx. In other words, the engagement portion 96 is a groove along the circumferential direction. When the second rotating body 9 is attached to the operator body 3, the claws 562 of the engagement pieces 56 of the first rotating body 5 are inserted in the engagement portion 96. This restricts detachment of the second rotating body 9 from the operator body 3 (the first rotating body 5).

As described above, the engagement piece 56 includes the elastic portion 563 that enables the claw 562 to elastically deform toward the attachment portion 561, that is, outward in the radial direction centered at the rotation axis Rx. Thus, when the second rotating body 9 is pulled up from the operator body 3 (the first rotating body 5) in the +Z direction with predetermined force or larger, the claw 562 comes off from the engagement portion 96. Accordingly, the second rotating body 9 is removed from the operator body 3.

The coupler 97 is a portion of the second rotating body 9 coupled to the plate 6. The coupler 97 is provided at an end portion in the −Z direction of the cylindrical portion 95. The coupler 97 includes the projections 98 provided at three of four portions defined at regular intervals along the circumferential direction centered at the rotation axis Rx as viewed from the −Z direction and the single recess 99 provided at the remaining one portion.

The three projections 98 project in the −Z direction from the end portion in the −Z direction of the cylindrical portion 95. Each of the projections 98 is inserted in the corresponding one of the cuts 65 of the plate 6 from the +Z direction.

The single recess 99 is recessed in the +Z direction from the end portion in the −Z direction of the cylindrical portion 95. The projection 64 of the plate 6 is inserted into the recess 99 from the −Z direction.

Cross-Sectional Structure of Rotary Operator

Figure 17:
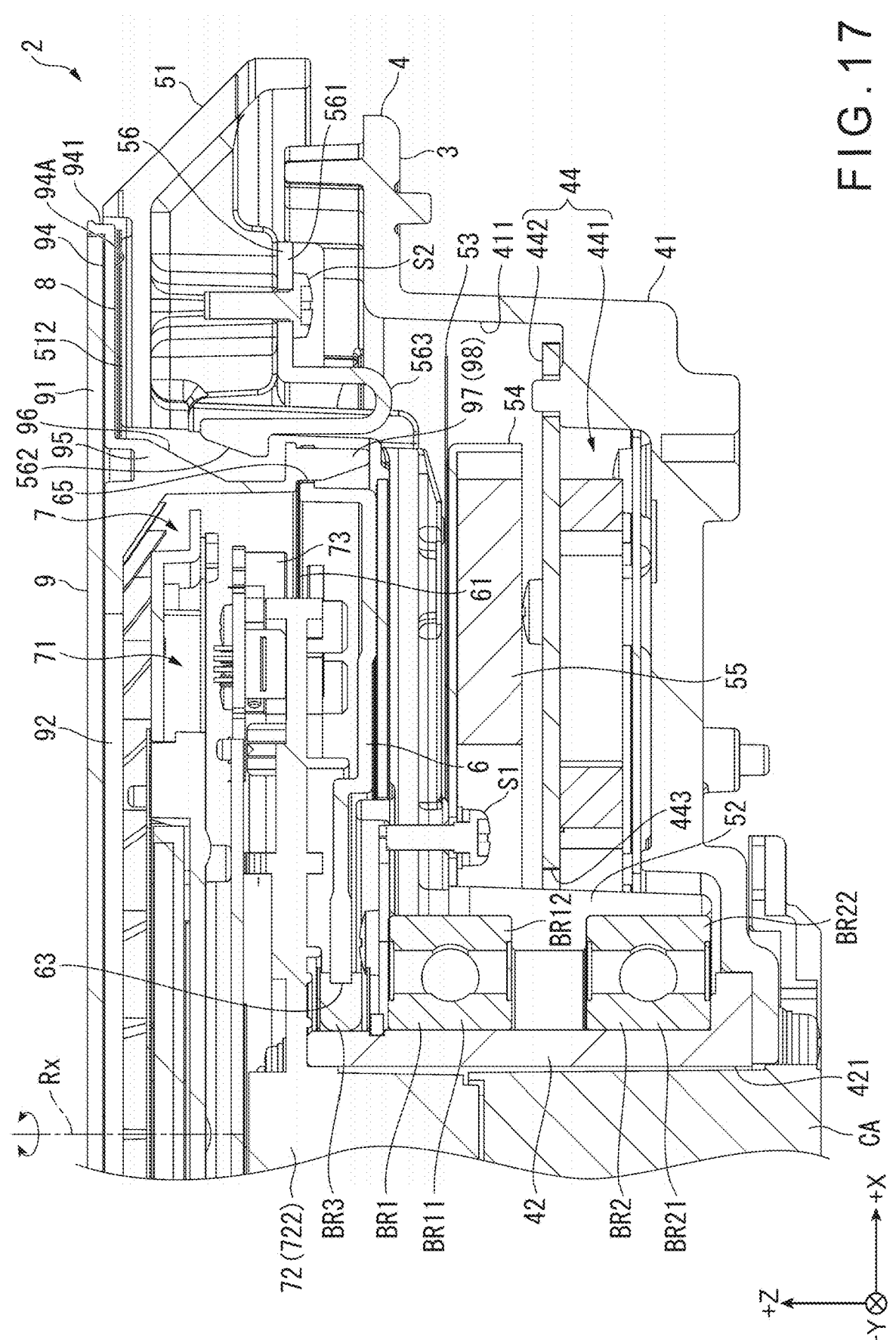
FIG. 17 is an enlarged cross-sectional view of a part of the rotary operator according to the exemplary embodiment.

FIG. 17 is an enlarged cross-sectional view of a part of the rotary operator 2 along the XZ plane.

As above, the second rotating body 9 is mounted on the first rotating body 5 to be in direct contact with the first rotating body 5 or in contact with the first rotating body 5 with the friction adjusting member(s) 8 in between and is also coupled to the plate 6, which is a third rotating body fixed to the shaft 42 to be rotatable around the rotation axis Rx. Thus, the second rotating body 9 rotates integrally with the first rotating body 5 around the rotation axis Rx, and also rotates integrally with the plate 6 independently of the first rotation body 5 around the rotation axis Rx in response to a user's rotating operation. Further, when the second rotating body 9 is removed, the installation portion 512 of the first rotating body 5 is exposed. This allows the friction adjusting member(s) 8 disposed between the first rotating body 5 and the second rotating body 9 to be replaced.

Referring to FIG. 17, such features of the sound control device 1 will be described in detail.

The inner races BR11 and BR21 of the bearings BR1 and BR2 provided for the cylinder 52 are fixed to the shaft 42 of the base member 4, so that the first rotating body 5 is supported by the shaft 42 rotatably around the rotation axis Rx. The plurality of magnets 55 provided for the holding member 54 are rotated by the drive device 44 disposed within the recess 411 of the base member 4, thereby causing the first rotating body 5 to rotate clockwise or counterclockwise as viewed from the +Z direction.

The inner race BR31 of the bearing BR3 provided in the opening 63 is fixed to the shaft 42, so that the plate 6 is supported by the shaft 42 rotatably around the rotation axis Rx. The display 7, which is fixed to the shaft 42, is disposed in the +Z direction with respect to the plate 6.

The second rotating body 9 is disposed to cover the display 7 and the installation portion 512 of the first rotating body 5 from the +Z direction. The friction adjusting member(s) 8, which is installed on the installation portion 512, is disposed between the first rotating body 5 and the second rotating body 9.

The second rotating body 9 is coupled to the plate 6 by inserting the cylindrical portion 95 of the second rotating body 9 into the recess 511 of the first rotating body 5, inserting the projections 98 of the second rotating body 9 into the cuts 65 of the plate 6, and inserting the projection 64 (see FIG. 9) of the plate 6 into the recess 99 (see FIG. 15) of the second rotating body 9. The second rotating body 9 and the plate 6 are thus integrated and the second rotating body 9 is supported by the shaft 42 to be rotatable around the rotation axis Rx with the plate 6 in between.

Such a second rotating body 9, which is mounted on the first rotating body 5, rotates integrally with the first rotating body 5. On the other hand, the second rotating body 9, which is in contact with the first rotating body 5 with the friction adjusting member(s) 8 in between, is rotatable relative to the first rotating body 5 around the rotation axis Rx. That is, the second rotating body 9 is rotatable independently of the first rotating body 5.

The first detector 43 (see FIG. 6) of the base member 4 detects the rotation state of the first rotating body 5. The second detector 73, which is provided for the display 7 fixed to the shaft 42, detects the rotation state of the second rotating body 9 by detecting the rotation state of the plate 6.

The claw 562 of the engagement piece 56, as the first engagement portion, of the first rotating body 5 is disposed to be engageable with the engagement portion 96, as the second engagement portion, of the second rotating body 9. This restricts detachment of the second rotating body 9 from the operator body 3.

On the other hand, when the second rotating body 9 is pulled up in the +Z direction with predetermined force or larger, pressing force outward in the radial direction centered at the rotation axis Rx acts on the claw 562 being in contact with the engagement portion 96. The elastic portion 563 is elastically deformed by the pressing force, causing the claw 562 to move outward in the radial direction centered at the rotation axis Rx. This makes it possible to remove the second rotating body 9 from the operator body 3 and the friction adjusting member 8 provided for the installation portion 512 of the first rotating body 5 is exposed, which allows the friction adjusting member 8 to be replaced.

Effects of Exemplary Embodiment

The sound control device 1 according to the exemplary embodiment described above produces the following effects.

The sound control device 1 functions as an operation device including the rotary operator 2.

The rotary operator 2 includes the first rotating body 5, the friction adjusting member(s) 8, and the second rotating body 9. The first rotating body 5 is rotatable around the imaginary rotation axis Rx. The second rotating body 9 is detachably attached to the operator body 3. The second rotating body 9 rotates integrally with the first rotating body 5, and also is rotatable around the rotation axis Rx independently of the first rotating body 5. The friction adjusting member 8, which is covered by the second rotating body 9 as viewed from a second rotating body 9 side with respect to the first rotating body 5, adjusts the friction force between the first rotating body 5 and the second rotating body 9. The first rotating body 5 includes the engagement piece 56 and the installation portion 512 to which the friction adjusting member 8 is detachably attached. The engagement piece 56 corresponds to the first engagement portion. The second rotating body 9 includes the engagement portion 96 engageable with the claws 562 of the engagement pieces 56. The engagement portion 96 corresponds to the second engagement portion.

Such a configuration makes it possible to expose the friction adjusting member 8 installed on the installation portion 512 by removing the second rotating body 9 covering the friction adjusting member 8. The friction adjusting member 8 can thus be replaced, and the friction force between the first rotating body 5 and the second rotating body 9 is adjustable. It is thus possible to adjust the friction force depending on the user's preference and to adjust the operational feeling of the rotary operator depending on the user.

Further, the claws 562 of the engagement pieces 56 of the first rotating body 5 are engageable with the engagement portion 96 of the second rotating body 9. The detachment of the second rotating body 9 is restricted by engaging the claws 562 with the engagement portion 96. Accordingly, it is possible to restrict unexpected detachment of the second rotating body 9 from the operator body 3.

The rotary operator 2 includes the drive device 44 that rotates the first rotating body 5.

Such a configuration makes it possible to constantly rotate the first rotating body 5 during the use of the rotary operator 2. The rotary operator 2 can thus be configured like a turntable that rotates a phonograph record.

The friction adjusting member 8 of the rotary operator 2 is in an annular shape around the rotation axis Rx. The installation portion 512 is provided along the circumferential edge of the first rotating body 5 centered at the rotation axis Rx.

In such a configuration, the friction adjusting member 8 is in an annular shape, which makes it possible to substantially uniformly adjust the friction force between the first rotating body 5 and the second rotating body 9 in the circumferential direction centered at the rotation axis Rx. The operational feeling of the rotary operator 2 is thus easily adjusted.

The rotary operator 2 includes the plate 6 that is provided between the first rotating body 5 and the second rotating body 9 and that is rotatable around the rotation axis Rx independently of the first rotating body 5. The plate 6 corresponds to the third rotating body. The second rotating body 9 includes the coupler 97 coupled to the plate 6.

In such a configuration, the second rotating body 9 is coupled to the plate 6 that is rotatable around the rotation axis Rx independently of the first rotating body 5, which enables the second rotating body 9 to be rotatable around the rotation axis Rx independently of the first rotating body 5.

The rotary operator 2 includes the second detector 73 that detects the rotation state of the plate 6 as the rotation state of the rotating body 9.

Such a configuration makes it possible to dispose the second detector 73 within the first rotating body 5. The rotary operator 2 can thus be downsized compared to a case where the rotation state of the second rotating body 9 is directly detected.

The rotary operator 2 includes the display 7 disposed at a position overlapping with the rotation axis Rx as viewed from the second rotating body 9 side with respect to the first rotating body 5.

In such a configuration, a variety of indications may be displayed on the display 7 provided for the rotary operator 2, facilitating the versatility of the rotary operator 2.

Further, it is possible to easily arrange the display 7 at a center portion of the second rotating body 9 as viewed from the +Z direction. A user thus easily watches the indication(s) on the display 7.

The second rotating body 9 of the rotary operator 2 includes the light-transmitting portion 911 at a position covering the display 7 as viewed from the second rotating body 9 side with respect to the first rotating body 5.

Such a configuration enables the second rotating body 9 to be disposed to cover the display 7, making it possible to increase an area of the second rotating body 9 for a user to touch as compared with a case where the second rotating body 9 is provided in a manner to avoid the display 7. The operability of the second rotating body 9 is thus enhanced. Further, since the second rotating body 9 covering the display 7 includes the light-transmitting portion 911, a user can visually confirm the indication on the display 7 through the light-transmitting portion 911.

The first rotating body 5 of the rotary operator 2 has the recess 511 that includes the rotation axis Rx as viewed along the rotation axis Rx and that is recessed opposite the second rotating body 9. That is, the first rotating body 5 has the recess 511 that includes the rotation axis Rx as viewed from the +Z direction and that is recessed in the −Z direction. The plate 6, which is the third rotating body, and the display 7 are disposed within the recess 511.

In such a configuration, the plate 6 and the display 7 are provided within the recess 511 of the first rotating body 5, which allows the rotary operator 2 to have a compact size.

The second rotating body 9 of the rotary operator 2 includes the cylindrical portion 95. The cylindrical portion 95 is formed in a cylindrical shape around the rotation axis Rx and inserted in the recess 511. The engagement portion 96, which is the second engagement portion, is provided for the cylindrical portion 95.

In such a configuration, the cylindrical portion 95 is inserted in the recess 511, inhibiting unexpected detachment of the second rotating body 9 from the first rotating body 5.

Further, the engagement portion 96 is provided for the cylindrical portion 95. This makes it possible to easily maintain an engagement state between the engagement portion 96 and the claw 562 of the engagement piece 56 as the first engagement portion within the first rotating body 5, and possible to inhibit unexpected detachment of the second rotating body 9 from the first rotating body 5.

It is thus possible to stably rotate the second rotating body 9.

The plate 6, which is the third rotating body, of the rotary operator 2 is provided opposite to the second rotating body 9 with respect to the display 7.

In such a configuration, the display 7 is sandwiched between the second rotating body 9 and the plate 6. This makes it possible to dispose the plate 6 within the recess 511 without blocking the indication on the display 7. The rotary operator 2 is thus capable of having a compact size.

The rotary operator 2 includes the shaft 42. The shaft 42, which defines the rotation axis Rx, supports the first rotating body 5 and the plate 6 in a manner for each of them to be independently rotatable.

Such a configuration makes it possible to stably support the first rotating body 5 and stably support the second rotating body 9 coupled to the plate 6.

The second rotating body 9 of the rotary operator 2 includes the step 941. The step 941 is provided for the circumferential edge of the support 94 of the second rotating body 9 and has the portion near the first rotating body 5 that has a smaller outer diameter than the outer diameter of the portion opposite the first rotating body 5.

Such a configuration makes it possible for a user to easily insert, for instance, his/her fingernail under the step 941 of the second rotating body 9 when detaching the second rotating body 9 from the first rotating body 5. It is thus possible to simplify the operation to detach the second rotating body 9 from the first rotating body 5.

The friction adjusting member 8 of the rotary operator 2 is formed from a resin containing polyethylene terephthalate.

Such a configuration makes it possible to smoothly rotate the second rotating body 9 with respect to the first rotating body 5 with the friction adjusting member 8 interposed, as compared with a case where the friction adjusting member 8 is formed from felt or any other resin. Accordingly, the friction force between the first rotating body 5 and the second rotating body 9 and, consequently, the operational feeling of the second rotating body 9 are easily adjustable, for instance, by adjusting the number of the friction adjusting members 8 disposed between the first rotating body 5 and the second rotating body 9.

Modifications of Exemplary Embodiment

The invention is not limited to the above exemplary embodiment and modifications, improvements, and the like are within the scope of the invention, insofar as the object of the invention is achievable.

In the above exemplary embodiment, the first rotating body 5 includes the engagement pieces 56 as the first engagement portion and the second rotating body 9 includes the engagement portion 96 as the second engagement portion engageable with the engagement pieces 56. That is, the first rotating body 5 includes, as the first engagement portion, the engagement pieces 56 that restrict the detachment of the second rotating body 9. The invention, however, is not limited thereto, and any other configuration is possible as long as one of the first engagement portion and the second engagement portion is engageable with the other engagement portion. For instance, one of the first engagement portion and the second engagement portion may be a guide groove provided along the circumferential direction centered at the rotation axis and the other engagement portion may be a guide pin(s) to be inserted in the guide groove. In this case, the 20 plate 6 as the third rotating body may not be provided.

In the above exemplary embodiment, the rotary operator 2 includes the drive device 44 that rotates the first rotating body 5. The invention, however, is not limited thereto, and the drive device 44 may not be provided.

In the above exemplary embodiment, the drive device 44 is configured including an annular motor. The invention, however, is not limited thereto, and the drive device 44 may have any other configuration.

In the above exemplary embodiment, the friction adjusting member 8 is formed in a ring shape as viewed from the +Z direction. The invention, however, is not limited thereto, and the friction adjusting member 8 may have any other shape. For instance, in a case where the display 7 is not provided for the rotary operator 2, the friction adjusting member 8 may be formed in a circular shape as viewed from the +Z direction.

In the above exemplary embodiment, the rotary operator 2 includes the plate 6 that is provided between the first rotating body 5 and the second rotating body 9 and that is rotatable around the rotation axis Rx independently of the first rotating body 5. The plate 6 corresponds to the third rotating body. The second rotating body 9 is coupled to the plate 6. The invention, however, is not limited thereto, and the third rotating body may not be provided.

In the above exemplary embodiment, the rotary operator 2 includes the second detector 73 as the detector that detects the rotation state of the plate 6 as the rotation state of the second rotating body 9. The invention, however, is not limited thereto, and the second detector 73 may not be provided. Further, the second detector 73 detects, with use of the rotation detecting disc 61 of the plate 6, the rotation state of the plate 6 and, consequently, the rotation state of the second rotating body 9. The invention, however, is not limited thereto, and the second detector 73 may detect the rotation state of the second rotating body 9 or may detect the rotation state of the plate 6 as the rotation state of the second rotating body 9 with use of another portion of the plate 6.

In the above exemplary embodiment, the rotary operator 2 includes the display 7 disposed at the position overlapping with the rotation axis Rx as viewed from the +Z direction. The invention, however, is not limited thereto, and the display 7 may not be provided. In this case, the second rotating body 9 may not include the light-transmitting portion 911. Further, the position of the display 7 may not be the position overlapping with the rotation axis Rx as viewed from the +Z direction even in a case where the rotary operator 2 includes the display 7.

In the above exemplary embodiment, the second rotating body 9 includes the light-transmitting portion 911 at the position covering the display 7 as viewed from the +Z direction. The invention, however, is not limited thereto, and the second rotating body 9 may be formed from a light-transmitting material. Further, the second rotating body 9 may be formed in an annular shape around the rotation axis Rx with an opening at a position corresponding to the display 7 as viewed from the +Z direction. In this case, the opening serves as the light-transmitting portion.

In the above exemplary embodiment, the first rotating body 5 has the recess 511. The recess 511 includes the rotation axis Rx as viewed along the rotation axis Rx and is recessed opposite the second rotating body 9, i.e., in the –Z direction. The plate 6, which is the third rotating body, and the display 7 are disposed within the recess 511. The invention, however, is not limited thereto, and the first rotating body 5 may not have the recess 511. Further, the plate 6 and the display 7 may not be disposed within the recess 511.

In the above exemplary embodiment, the second rotating body 9 includes the cylindrical portion 95, and the cylindrical portion 95 is formed in a cylindrical shape around the rotation axis Rx and inserted in the recess 511. Further, the engagement portion 96, which is the second engagement portion, is provided for the cylindrical portion 95. The invention, however, is not limited thereto. The second rotating body 9 may not include the cylindrical portion 95 and the second engagement portion may be provided for another portion of the second rotating body 9.

In the above exemplary embodiment, the plate 6, which is the third rotating body, is provided opposite the second rotating body 9 with respect to the display 7. The invention, however, is not limited thereto, and the third rotating body may be provided at any other position as long as not blocking the indication on the display 7. For instance, the third rotating body may be supported by the first rotating body 5 to be rotatable around the rotation axis Rx independently of the first rotating body 5.

In the above exemplary embodiment, the rotary operator 2 includes the shaft 42 and the shaft 42, which defines the rotation axis Rx, supports the first rotating body 5 and the plate 6 that is the third rotating body in a manner for each of them to be independently rotatable. The invention, however, is not limited thereto, and the shaft 42 may not be provided. That is, it is only necessary that the first rotating body and the third rotating body are each independently rotatably supported, and a support structure of the first rotating body and a support structure of the third rotating body are not limited to the above.

In the above exemplary embodiment, the second rotating body 9 includes the step 941. The step 941 is provided for the circumferential edge of the support 94 of the second rotating body 9, and has the portion in the −Z direction that has a smaller outer diameter than the outer diameter of the portion in the +Z direction. The invention, however, is not limited thereto, and the second rotating body 9 may not include the step 941. Further, for instance, a portion in any other form, such as a recess, may be provided for a part of the second rotating body 9 as long as making it easy for a user to remove the second rotating body 9 from the operator body 3.

In the above exemplary embodiment, the friction adjusting member 8 is formed from a resin containing PET. The invention, however, is not limited thereto, and the friction adjusting member 8 may be formed from any other material. Further, the friction adjusting member 8 may include a combination of a plurality of members.

In the above exemplary embodiment, the rotary operator 2 is provided for the sound control device 1 that has an operation device function. That is, the sound control device 1 includes the rotary operator 2. The invention, however, is not limited thereto, and the invention is applicable to a rotary operator to be provided for an operation device. Further, the rotary operator according to the invention is usable alone. Furthermore, even in cases where the rotary operator of the invention is used in the operation device and the sound control device, the configurations of the operation device and the sound control device are not limited to the above and may include any other configuration.

SUMMARY OF THE INVENTION

The summary of the invention is appended below.

[1] A rotary operator includes: a first rotating body rotatable around an imaginary rotation axis; a second rotating body being detachably attached, the second rotating body being configured to rotate integrally with the first rotating body and also being rotatable around the rotation axis independently of the first rotating body; and a friction adjusting member being covered by the second rotating body as viewed from a side of the second rotating body with respect to the first rotating body and being configured to adjust friction force between the first rotating body and the second rotating body, in which the first rotating body includes: an installation portion to which the friction adjusting member is detachably attached; and a first engagement portion, and the second rotating body includes a second engagement portion engageable with the first engagement portion.

Such a configuration makes it possible to expose the friction adjusting member installed on the installation portion by removing the second rotating body covering the friction adjusting member. It is thus possible to adjust the friction force between the first rotating body and the second rotating body by replacing the friction adjusting member or performing, on the friction adjusting member, an operation to adjust the friction force produced by the friction adjusting member. Accordingly, it is possible to adjust the friction force depending on the user's preference and to adjust the operational feeling of the rotary operator depending on the user.

Further, the first engagement portion of the first rotating body is engageable with the second engagement portion of the second rotating body. It is thus possible to restrict unexpected detachment of the second rotating body, for instance, when one of the first engagement portion and the second engagement portion is configured to restrict the detachment of the second rotating body. On the other hand, it is possible to enable the second rotating body to stably rotate relative to the first rotating body, for instance, when one of the first engagement portion and the second engagement portion is configured to guide the rotation of the second rotating body.

[2] The rotary operator according to [1] may further include a drive device configured to rotate the first rotating body.

Such a configuration makes it possible to constantly rotate the first rotating body during the use of the rotary operator. The rotary operator can thus be configured like a turntable that rotates a phonograph record.

[3] In the rotary operator according to [1] or [2], the friction adjusting member may be in an annular shape around the rotation axis, and the installation portion may be provided along a circumferential edge of the first rotating body centered at the rotation axis.

In such a configuration, the friction adjusting member is in an annular shape, which makes it possible to substantially uniformly adjust the friction force between the first rotating body and the second rotating body in a circumferential direction centered at the rotation axis. The operational feeling of the rotary operator is thus easily adjusted.

[4] The rotary operator according to [3] may further include a third rotating body provided between the first rotating body and the second rotating body, the third rotating body being rotatable around the rotation axis independently of the first rotating body, in which the second rotating body may include a coupler coupled to the third rotating body.

In such a configuration, the second rotating body is coupled to the third rotating body that is rotatable around the rotation axis independently of the first rotating body, which enables the second rotating body to be rotatable around the rotation axis independently of the first rotating body.

[5] The rotary operator according to [4] may further include a detector configured to detect a rotation state of the third rotating body as a rotation state of the second rotating body.

Such a configuration makes it possible to dispose the detector within the first rotating body. The rotary operator can thus be downsized compared to a case where the rotation state of the second rotating body is directly detected.

[6] The rotary operator according to [4] or [5] may further include a display disposed at a position overlapping with the rotation axis as viewed from the side of the second rotating body with respect to the first rotating body.

In such a configuration, a variety of indications may be displayed on the display provided for the rotary operator, facilitating the versatility of the rotary operator.

Further, it is possible to easily arrange the display at a center portion of the second rotating body as viewed from the side of the second rotating body with respect to the first rotating body. A user thus easily watches the indication(s) on the display.

[7] In the rotary operator according to [6], the second rotating body may include a light-transmitting portion at a position covering the display as viewed from the side of the second rotating body with respect to the first rotating body.

Such a configuration enables the second rotating body to be disposed to cover the display, making it possible to increase an area of the second rotating body for a user to touch as compared with a case where the second rotating body is provided in a manner to avoid the display. The operability of the second rotating body is thus enhanced. Further, since the second rotating body covering the display includes the light-transmitting portion, a user can visually confirm the indication on the display through the light-transmitting portion.

[8] In the rotary operator according to [7], the first rotating body may have a recess including the rotation axis as viewed along the rotation axis, the recess being recessed opposite the second rotating body, and the third rotating body and the display may be disposed within the recess.

In such a configuration, the third rotating body and the display are provided within the recess of the first rotating body, which allows the rotary operator to have a compact size.

[9] In the rotary operator according to [8], the second rotating body may include a cylindrical portion formed in a cylindrical shape around the rotation axis, the cylindrical portion being inserted in the recess, and the second engagement portion may be provided for the cylindrical portion.

In such a configuration, the cylindrical portion is inserted in the recess, inhibiting unexpected detachment of the second rotating body from the first rotating body.

Further, the second engagement portion is provided for the cylindrical portion. This makes it possible to easily maintain an engagement state between the first engagement portion and the second engagement portion within the first rotating body, and possible to inhibit unexpected detachment of the second rotating body from the first rotating body.

It is thus possible to stably rotate the second rotating body.

In the rotary operator according to any one of [6] to [9], the third rotating body may be provided opposite the second rotating body with respect to the display.

In such a configuration, the display is sandwiched between the second rotating body and the third rotating body. This makes it possible to dispose the third rotating body within the recess without blocking the indication on the display. The rotary operator can thus be configured compactly.

The rotary operator according to any one of [4] to may further include a shaft defining the rotation axis, the shaft supporting the first rotating body and the third rotating body in a manner for the first rotating body and the third rotating body to be each independently rotatable.

Such a configuration makes it possible to stably support the first rotating body and stably support the second rotating body coupled to the third rotating body.

In the rotary operator according to any one of [1] to [11], the second rotating body may include a step provided for a circumferential edge of the second rotating body, the step having a portion near the first rotating body that has a smaller outer diameter than an outer diameter of a portion opposite the first rotating body.

Such a configuration makes it possible for a user to easily insert, for instance, his/her fingernail under the step of the second rotating body when detaching the second rotating body from the first rotating body. It is thus possible to simplify the operation to detach the second rotating body from the first rotating body.

In the rotary operator according to any one of [1] to [12], the friction adjusting member may be formed from a resin containing polyethylene terephthalate.

Such a configuration makes it possible to smoothly rotate the second rotating body with respect to the first rotating body with the friction adjusting member interposed, as compared with a case where the friction adjusting member is formed from felt or any other resin. Accordingly, the friction force between the first rotating body and the second rotating body and, consequently, the operational feeling of the second rotating body are easily adjustable, for instance, by adjusting the number of the friction adjusting members disposed between the first rotating body and the second rotating body.

An operation device includes the rotary operator according to any one of [1] to [13].

Such an operation device is capable of producing effects similar to those of the rotary operator described above.

A sound control device includes the operation device according to [14]. Such a sound control device is capable of producing effects similar to those of the operation device described above.

The invention claimed is:

1. A rotary operator comprising:
a first rotating body rotatable around an imaginary rotation axis;
a second rotating body being detachably attached, the second rotating body being configured to rotate integrally with the first rotating body and also being rotatable around the rotation axis independently of the first rotating body; and
a friction adjusting member covered by the second rotating body as viewed from a side of the second rotating body with respect to the first rotating body, the friction adjusting member being configured to adjust friction force between the first rotating body and the second rotating body, wherein
the first rotating body comprises: an installation portion to which the friction adjusting member is detachably attached; and a first engagement portion, and
the second rotating body comprises a second engagement portion engageable with the first engagement portion.

2. The rotary operator according to claim 1, further comprising a drive device configured to rotate the first rotating body.

3. The rotary operator according to claim 1, wherein
the friction adjusting member is in an annular shape around the rotation axis, and
the installation portion is provided along a circumferential edge of the first rotating body centered at the rotation axis.

4. The rotary operator according to claim 3, further comprising a third rotating body provided between the first rotating body and the second rotating body, the third rotating body being rotatable around the rotation axis independently of the first rotating body, wherein
the second rotating body comprises a coupler coupled to the third rotating body.

5. The rotary operator according to claim 4, further comprising a detector configured to detect a rotation state of the third rotating body as a rotation state of the second rotating body.

6. The rotary operator according to claim 4, further comprising a display disposed at a position overlapping with the rotation axis as viewed from the side of the second rotating body with respect to the first rotating body.

7. The rotary operator according to claim 6, wherein the second rotating body comprises a light-transmitting portion at a position covering the display as viewed from the side of the second rotating body with respect to the first rotating body.

8. The rotary operator according to claim 7, wherein the first rotating body has a recess including the rotation axis as viewed along the rotation axis, the recess being recessed opposite the second rotating body, and the third rotating body and the display are disposed within the recess.

9. The rotary operator according to claim 8, wherein the second rotating body comprises a cylindrical portion formed in a cylindrical shape around the rotation axis, the cylindrical portion being inserted in the recess, and the second engagement portion is provided for the cylindrical portion.

10. The rotary operator according to claim 6, wherein the third rotating body is provided opposite the second rotating body with respect to the display.

11. The rotary operator according to claim 4, further comprising a shaft defining the rotation axis, the shaft supporting the first rotating body and the third rotating body in a manner for the first rotating body and the third rotating body to be each independently rotatable.

12. The rotary operator according to claim 1, wherein the second rotating body comprises a step provided for a circumferential edge of the second rotating body, the step having a portion in a first direction that has a smaller outer diameter than an outer diameter of a portion in a direction opposite to the first direction, the first direction being from the second rotating body toward the first rotating body.

13. The rotary operator according to claim 1, wherein the friction adjusting member is formed from a resin containing polyethylene terephthalate.

14. An operation device comprising the rotary operator according to claim 1.

15. A sound control device comprising the operation device according to claim 14.

* * * * *